(12) United States Patent
MacNee, III et al.

(10) Patent No.: US 7,341,303 B2
(45) Date of Patent: Mar. 11, 2008

(54) JOINT LOCKING DEVICE FOR A CONVERTIBLE ROOF SYSTEM

(75) Inventors: Arthur L. MacNee, III, Southgate, MI (US); Bradley R. Garska, Saline, MI (US); Stephen A. Doncov, Trenton, MI (US)

(73) Assignee: Specialty Vehicle Acquisition Corp., Los Angeles, CA (US)

( * ) Notice: Subject to any disclaimer, the term of this patent is extended or adjusted under 35 U.S.C. 154(b) by 0 days.

(21) Appl. No.: 11/477,511

(22) Filed: Jun. 29, 2006

(65) Prior Publication Data

US 2006/0255620 A1 Nov. 16, 2006

Related U.S. Application Data

(62) Division of application No. 10/836,322, filed on Apr. 30, 2004, now Pat. No. 7,104,587.

(51) Int. Cl.
*B60J 7/12* (2006.01)
(52) U.S. Cl. ........................ 296/121; 296/122
(58) Field of Classification Search ............... 296/121, 296/122, 107.09; 292/DIG. 5
See application file for complete search history.

(56) References Cited

U.S. PATENT DOCUMENTS

| | | | |
|---|---|---|---|
| 1,294,148 A | 2/1919 | Oliver | |
| 1,426,129 A | 8/1922 | Velo | |
| 2,193,091 A | 3/1940 | Fish | |
| 2,768,857 A | 10/1956 | Albrecht | |
| 2,794,672 A | 6/1957 | Burzi | |
| 3,002,785 A | 10/1961 | Larche | |
| 3,146,022 A | 8/1964 | Zeller | |
| 3,159,422 A | 12/1964 | Lautenbach | |
| 3,473,842 A | 10/1969 | Bracey et al. | |
| 4,573,732 A | 3/1986 | Muscat | |
| 4,711,485 A | 12/1987 | Maebayashi et al. | |
| 4,741,571 A | 5/1988 | Godette | |
| 4,828,317 A | 5/1989 | Muscat | |
| 4,840,419 A | 6/1989 | Kolb | |
| 4,929,015 A | 5/1990 | Bauer | |

(Continued)

FOREIGN PATENT DOCUMENTS

DE 3837522 A1 5/1990

(Continued)

OTHER PUBLICATIONS

Drawings of Toyota Celica Outfolding Top Stack Mechanism, 4 pages (offered for sale in U.S. prior to 2004).

(Continued)

*Primary Examiner*—Joseph D. Pape
(74) *Attorney, Agent, or Firm*—Harness, Dickey & Pierce, P.L.C.

(57) ABSTRACT

A joint locking device for a convertible roof system is provided. In another aspect of the present invention, an outfolding convertible roof employs a device for deterring member-to-member movement when fully raised. A further aspect of the present invention employs a linearly moving lock for a convertible roof joint, which may be automatically actuated and/or manually actuated. Still another aspect of the present invention provides a joint lock at the A-joint, B-joint, C-joint and/or another joint of the convertible roof top stack mechanism.

49 Claims, 21 Drawing Sheets

U.S. PATENT DOCUMENTS

| | | | |
|---|---|---|---|
| 4,958,882 A | 9/1990 | Kolb | |
| 5,004,291 A | 4/1991 | Bauer et al. | |
| 5,026,110 A | 6/1991 | Koop et al. | |
| 5,033,789 A | 7/1991 | Hayashi et al. | |
| 5,251,952 A | 10/1993 | Guckel et al. | |
| 5,301,987 A | 4/1994 | Tokarz et al. | |
| 5,490,709 A * | 2/1996 | Rahn | 296/122 |
| 5,624,149 A | 4/1997 | Tokarz | |
| 5,678,881 A | 10/1997 | Tokarz | |
| 5,765,904 A | 6/1998 | Aydt et al. | |
| 5,769,483 A | 6/1998 | Danzl et al. | |
| 5,779,299 A | 7/1998 | Purcell et al. | |
| 5,944,375 A | 8/1999 | Schenk et al. | |
| 5,975,620 A | 11/1999 | Jambor et al. | |
| 6,033,008 A | 3/2000 | Mattila | |
| 6,042,174 A | 3/2000 | Durrani | |
| 6,237,986 B1 | 5/2001 | Neubrand et al. | |
| 6,328,372 B1 | 12/2001 | Just | |
| 6,390,531 B1 | 5/2002 | Schutt | |
| 6,398,296 B1 | 6/2002 | Mayer | |
| 6,412,860 B1 | 7/2002 | Reinsch | |
| 6,416,111 B1 | 7/2002 | Neubrand | |
| 6,416,121 B1 | 7/2002 | Miklosi | |
| 6,428,090 B1 | 8/2002 | Reinsch | |
| 6,450,562 B1 | 9/2002 | Miklosi et al. | |
| 6,550,842 B1 | 4/2003 | Halbweiss et al. | |
| 6,561,566 B2 | 5/2003 | Dintner et al. | |
| 6,568,751 B2 | 5/2003 | Reinsch | |
| 6,623,065 B2 | 9/2003 | Halbweiss et al. | |
| 6,666,494 B2 | 12/2003 | Antreich | |
| 6,786,529 B2 | 9/2004 | Hasselgruber et al. | |
| 6,793,267 B2 | 9/2004 | Hesselhaus | |
| 6,802,554 B1 | 10/2004 | Just et al. | |
| 2002/0014783 A1 | 2/2002 | Nicastri | |
| 2003/0127883 A1 | 7/2003 | Antreich | |
| 2004/0032146 A1 | 2/2004 | Plesternings | |
| 2004/0094988 A1 | 5/2004 | Doncov et al. | |
| 2004/0232721 A1 | 11/2004 | Rawlings et al. | |
| 2005/0140165 A1 | 6/2005 | Heller et al. | |

FOREIGN PATENT DOCUMENTS

| | | |
|---|---|---|
| EP | 0 885 760 B1 | 2/2003 |
| GB | 675610 | 7/1952 |
| WO | WO 02/064391 | 8/2002 |

OTHER PUBLICATIONS

Photographs of A-joint in Outfolding Top Stack Mechanism, 2 pages (offered for sale in U.S. prior to 2004).

* cited by examiner

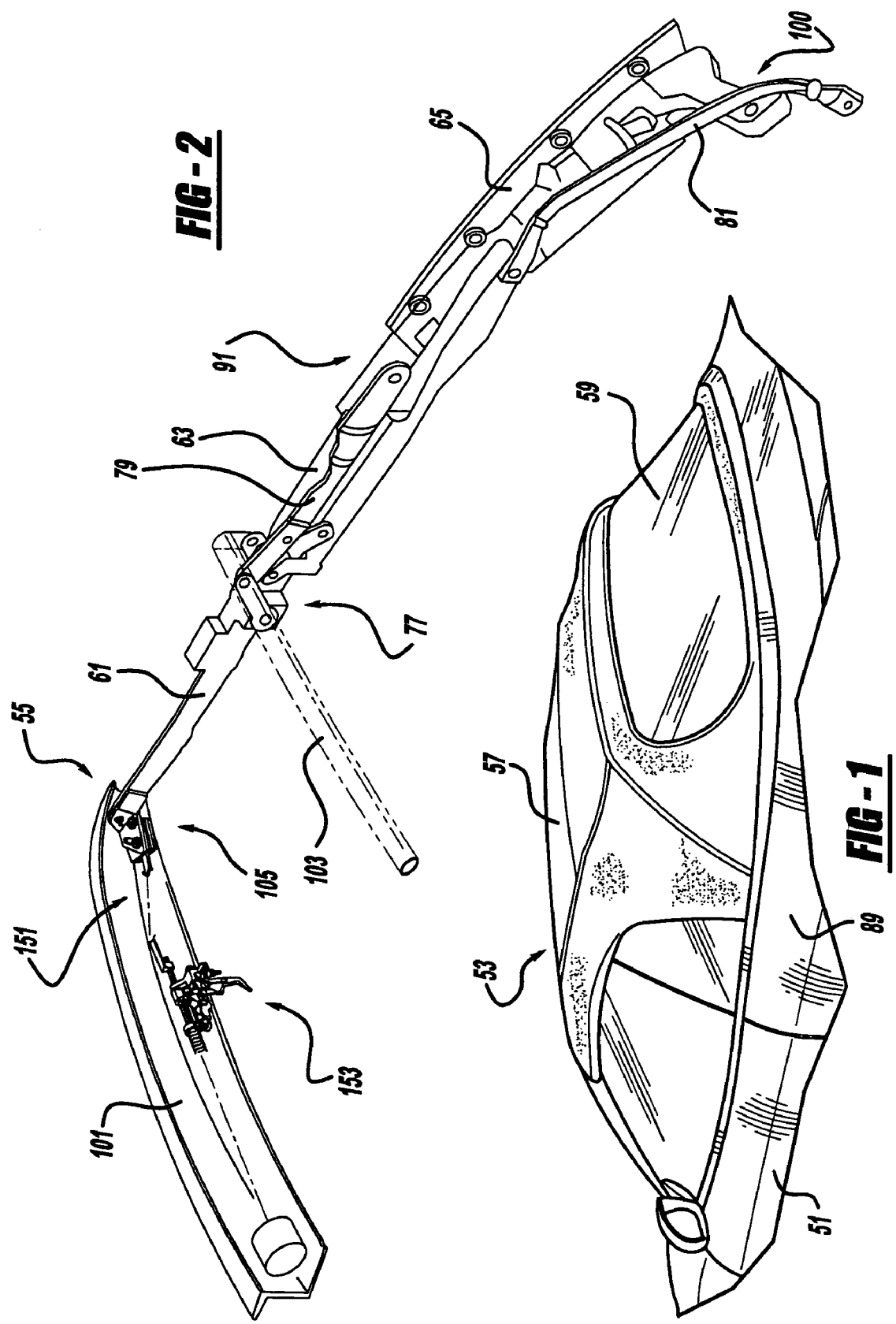

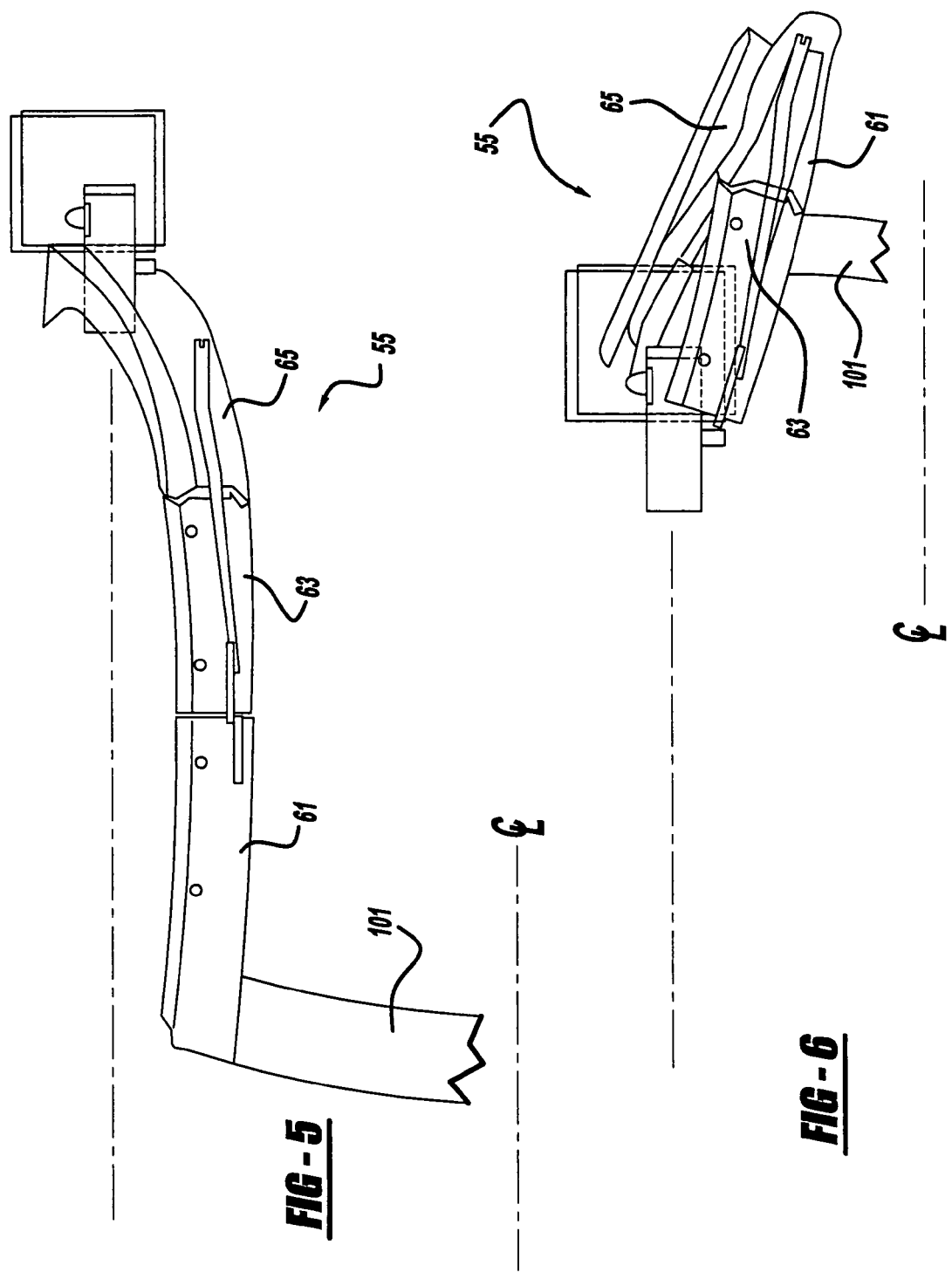

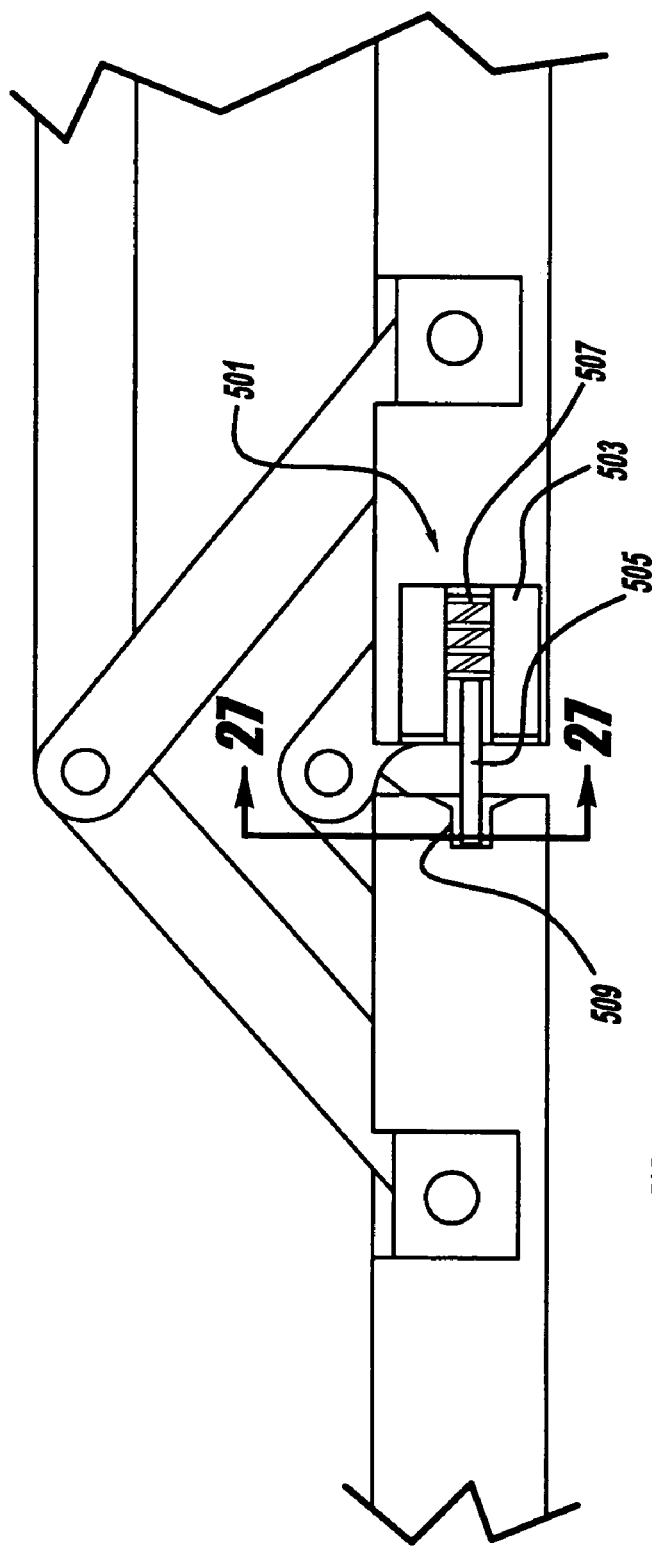
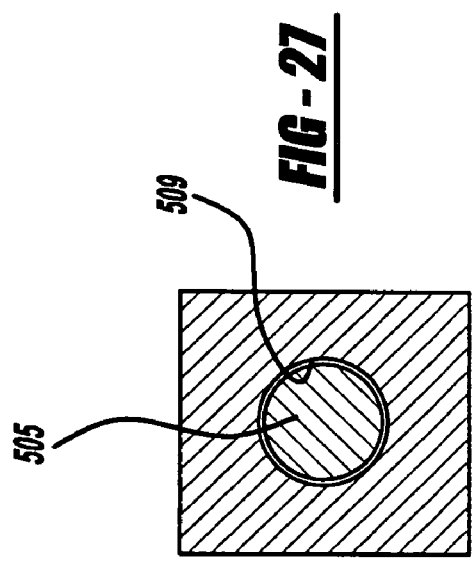

JOINT LOCKING DEVICE FOR A CONVERTIBLE ROOF SYSTEM

CROSS REFERENCE TO RELATED APPLICATION

This is a divisional application of U.S. patent application Ser. No. 10/836,322, filed Apr. 30, 2004, now U.S. Pat. No. 7,104,587 which is incorporated by reference herein.

BACKGROUND AND SUMMARY OF THE INVENTION

The present invention relates generally to a convertible roof system and more particularly to a joint locking device for a convertible roof system in an automotive vehicle.

There are two common types of soft top convertible roofs for automotive vehicles. The first and most common is known as a straight folding soft top in which the side rails retract in a predominantly straight folding, rearward manner from a raised position to a retracted position. The front side rails are affixed in a nonmoving manner to the forwardmost or number one roof bow by welding, riveting, one-piece casting or the like.

Furthermore, the second conventional type is known as an outfolding soft top, convertible roof. Outfolding convertible roofs allow the front side rails to inwardly rotate about a vertical (when fully raised) pivot axis coincidental with outboard ends of the number one roof bow when retracting from the raised position to the retracted and stowed position. While outfolding roofs are somewhat more complicated to design and produce, they advantageously allow for significantly improved retracted packaging without encroaching upon a large passenger seating area. This is often employed with vehicle having relative small roof dimensions in a cross-car direction relative to a larger cross-car body dimension.

Examples of outfolding convertible roofs are disclosed in the following U.S. Pat. No. 6,450,562 entitled "Pivot Drive for a Front Side Roof Rod of a Motor Vehicle or a Convertible Folding Top" which issued to Miklosi et al. on Sep. 17, 2002; and U.S. Pat. No. 4,828,317 entitled "Convertible Top Frame with Quarter Windows" which issued to Muscat on May 9, 1989; both of which are incorporated by reference herein. It is noteworthy that some traditional outfolding convertible roofs are not as structurally rigid at their joints as compared to many straight folding convertible roofs, when in their fully raised position. For example, even when the number one roof bow is latched to the stationary, windshield front header in the raised convertible roof position, the A-joint, located at the pivotal connection between the number one roof bow and the front side rail, still allows some relative rotational movement.

In accordance with the present invention, a joint locking device for a convertible roof system is provided. In another aspect of the present invention, an outfolding convertible roof employs a device for deterring member-to-member movement when fully raised. A further aspect of the present invention employs a linearly moving lock for a convertible roof joint, which may be automatically actuated and/or manually actuated. Still another aspect of the present invention provides a joint lock at the A-joint, B-joint, C-joint and/or another joint of the convertible roof top stack mechanism. In yet another aspect of the present invention, the joint lock is linearly and/or rotatably engagable with a receptacle. A method of operating a convertible roof employing a joint securing device is also provided.

The joint locking device for a convertible roof system of the present invention is advantageous over traditional systems in that the present invention enhances the stiffness and rigidity of the convertible roof when fully raised. This is significantly advantageous for improving rigidity of an outfolding convertible roof. Moreover, outfolding convertible roofs offer noteworthy retracted packaging advantages over straight folding convertible roofs. In many of the embodiments of the present invention, existing actuators are being used in a multi-functional manner to also drive the joint locking devices, whether directly (and actively) or indirectly (and passively). Additional advantages and features of the present invention will become apparent from the following description and appended claims, taken in conjunction with the accompanying drawings.

BRIEF DESCRIPTION OF THE DRAWINGS

FIGS. 1 and 2 are fragmentary perspective views showing a first preferred embodiment of a convertible roof system of the present invention employing a joint locking device;

FIGS. 5 and 6 are top diagrammatic views showing the first preferred embodiment convertible roof system in fully raised and fully retracted positions, respectively;

FIGS. 25 and 26 are diagrammatic side views showing a third alternate embodiment convertible roof system;

FIG. 27 is a cross sectional view, taken along line 27-27 of FIG. 26, showing the third alternate embodiment convertible roof system;

DETAILED DESCRIPTION OF THE PREFERRED EMBODIMENTS

Figure 3:
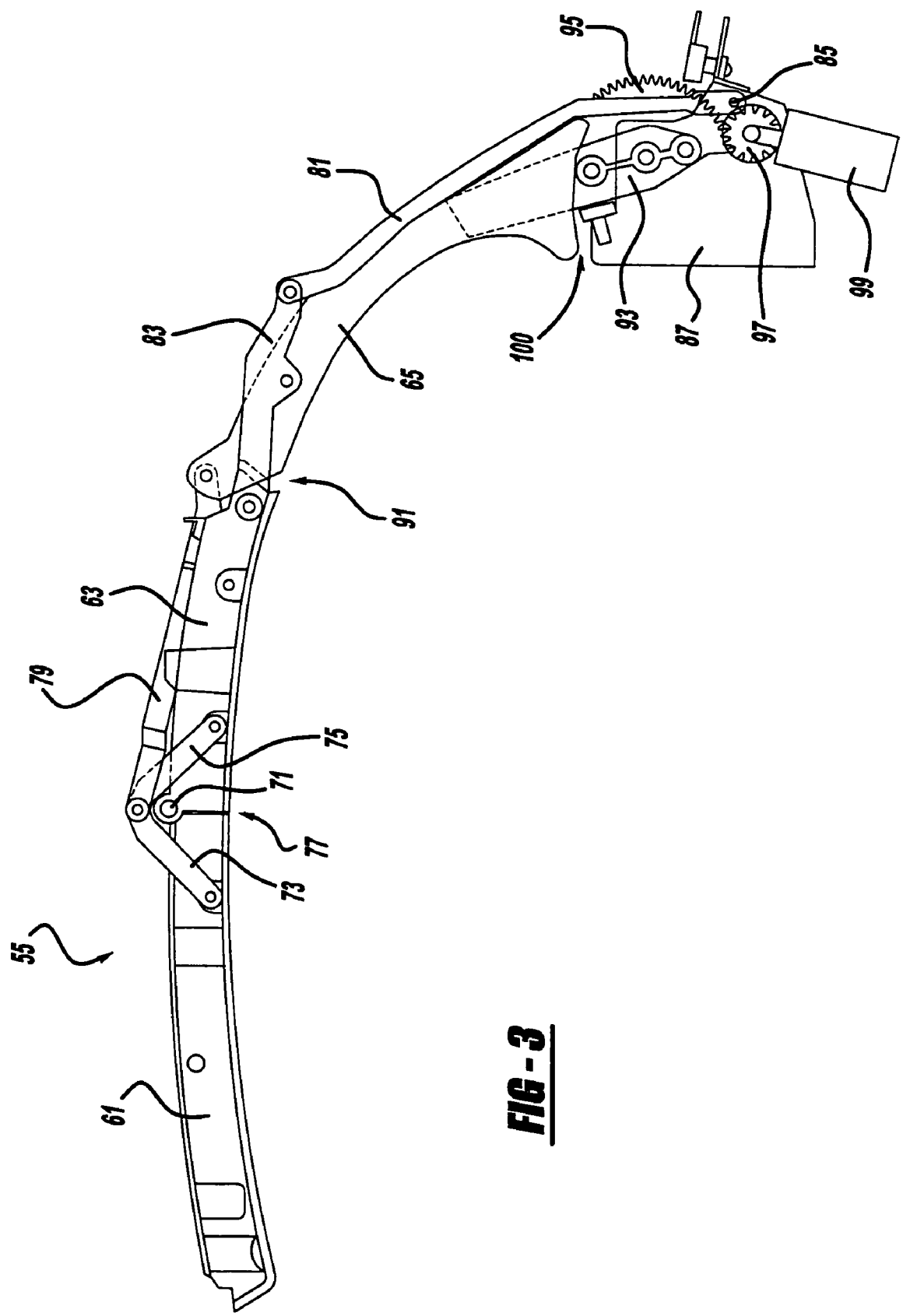
FIGS. 3 and 4 are side diagrammatic views showing the first preferred embodiment convertible roof system in fully raised and partially retracted positions, respectively.
Figure 4:
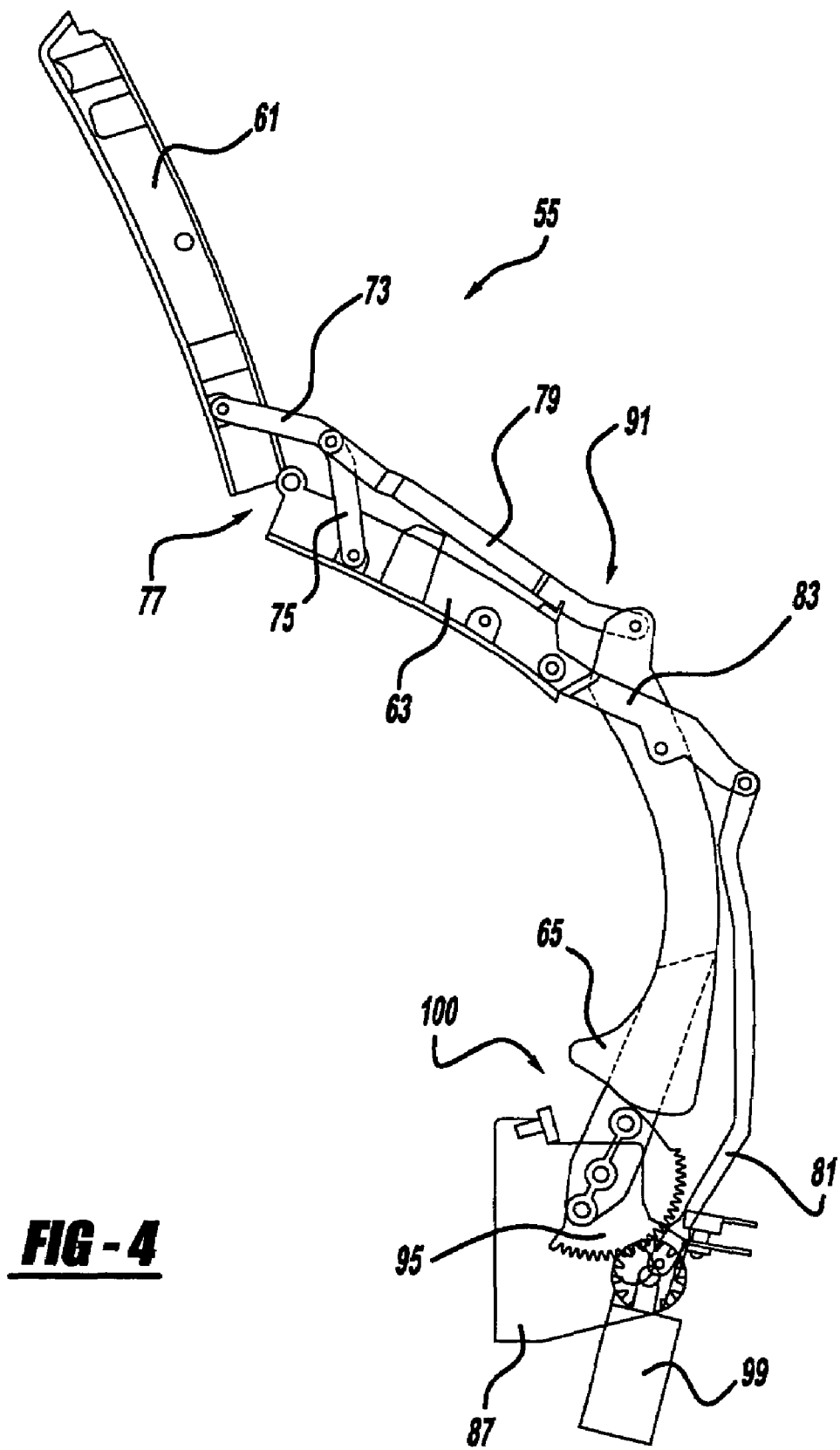
Figure 7A:
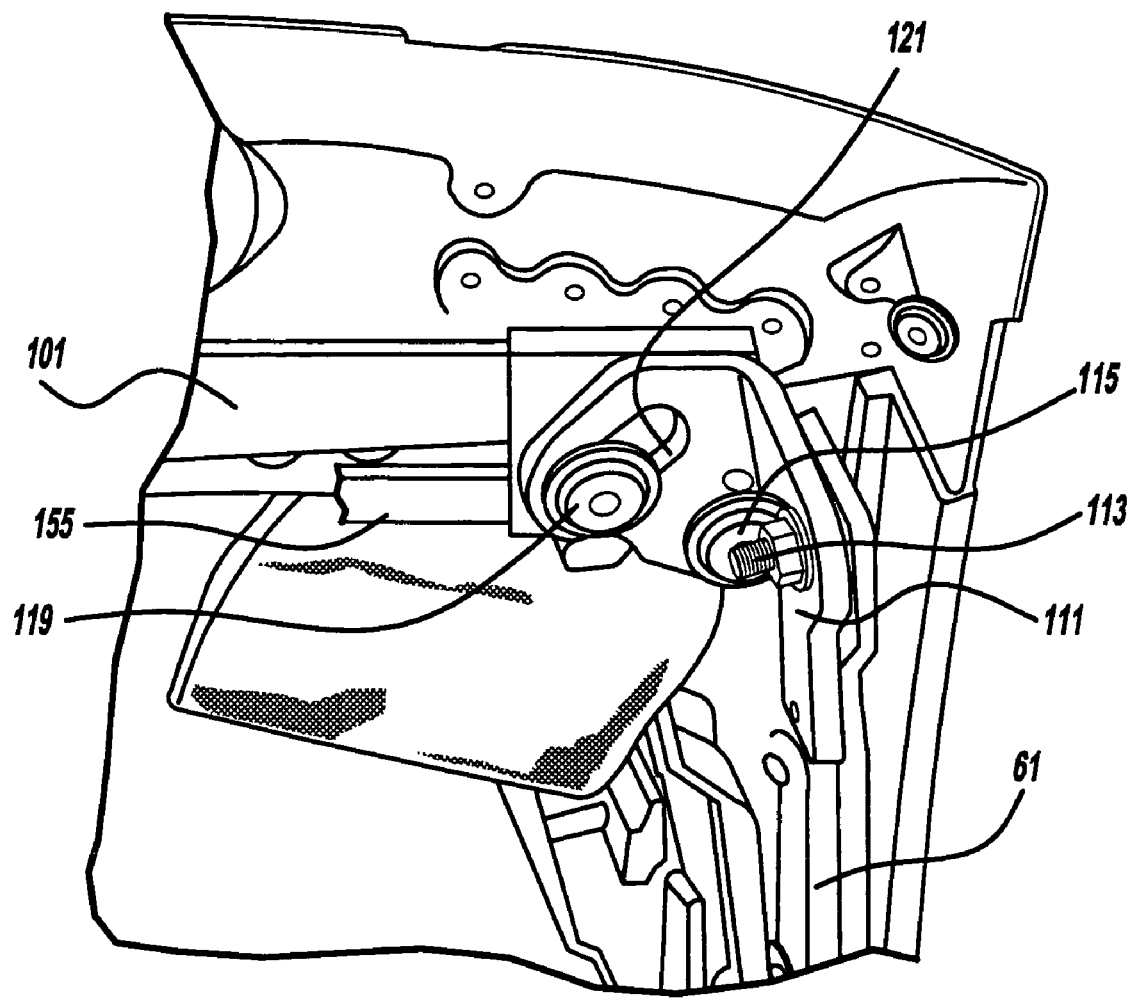
FIGS. 7A and 7B are fragmentary and perspective views showing the first preferred embodiment convertible roof system.
Figure 7B:
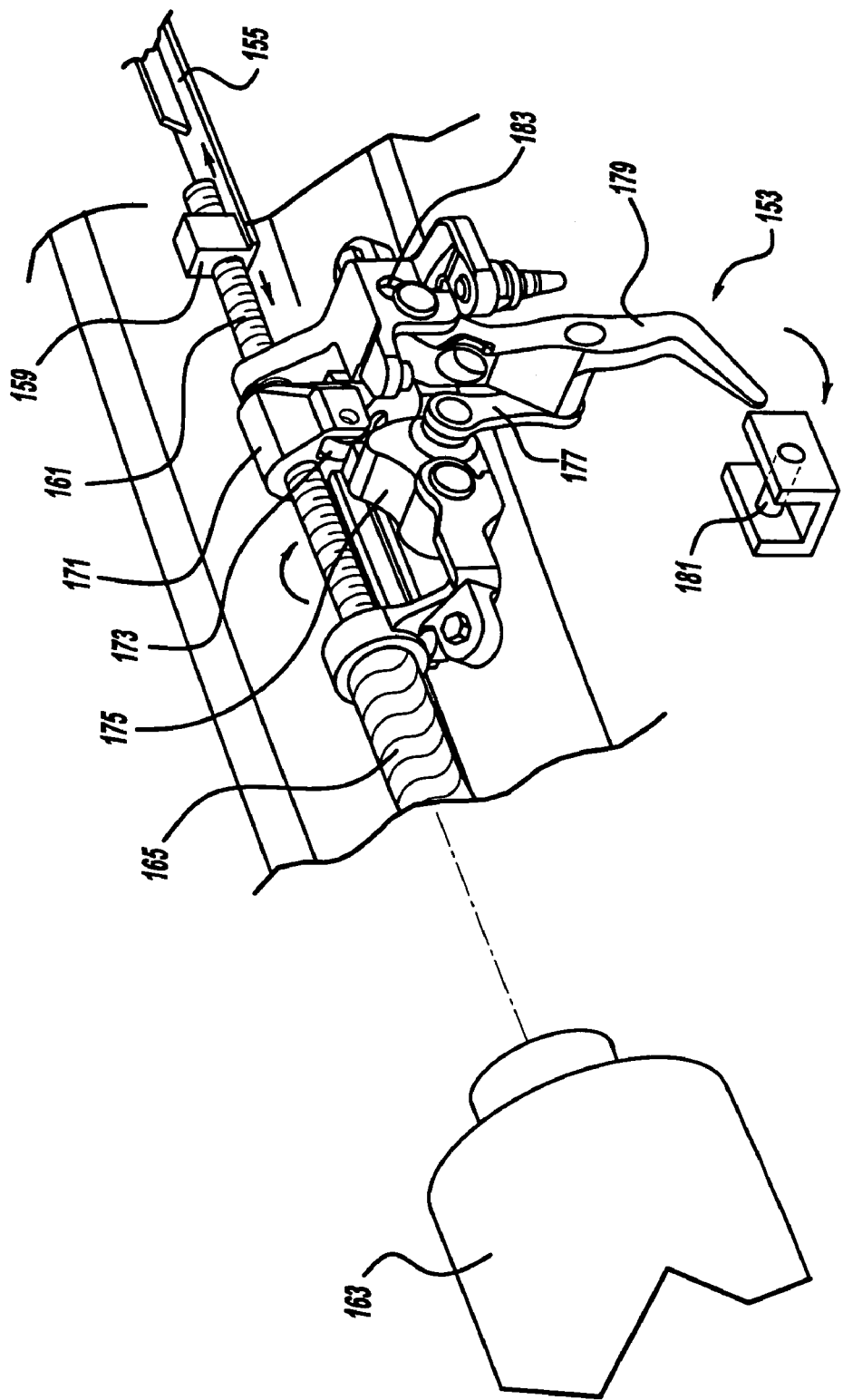
Figure 8:
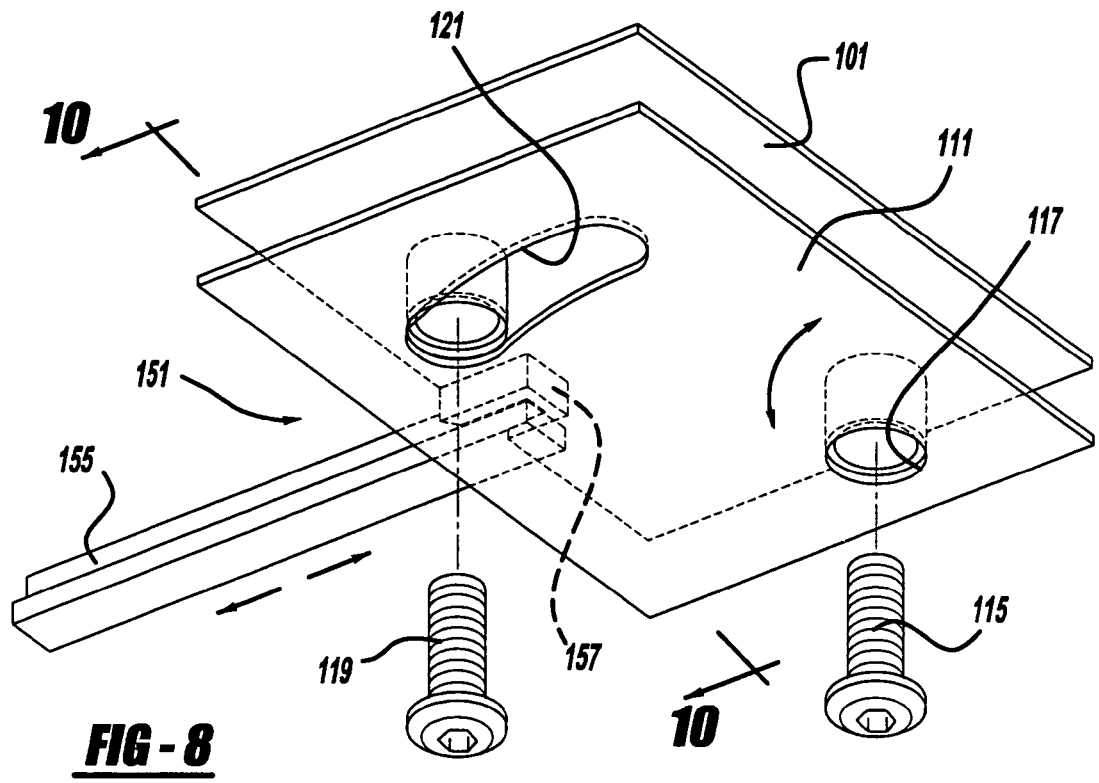
FIGS. 8 and 9 are perspective views, with a bracket and bow shown diagrammatically, showing the first preferred embodiment convertible roof system.
Figure 9:
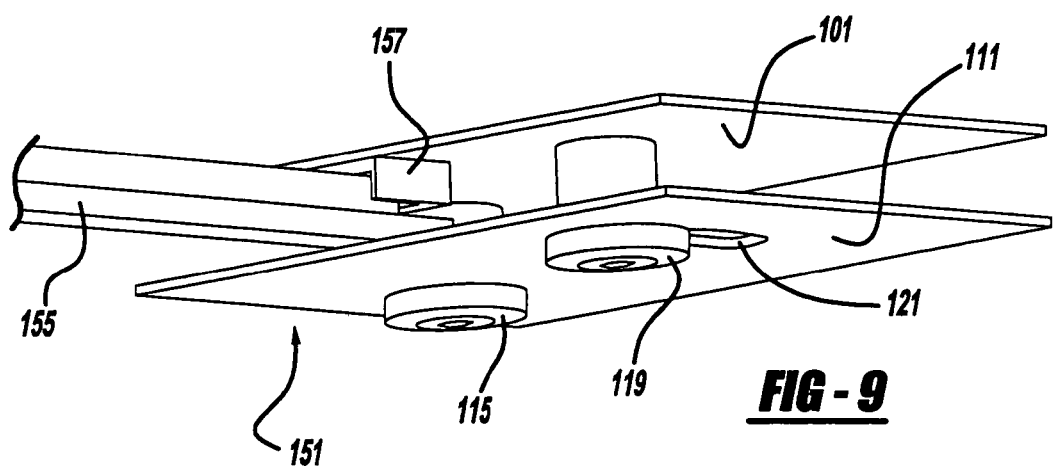
Figure 10:
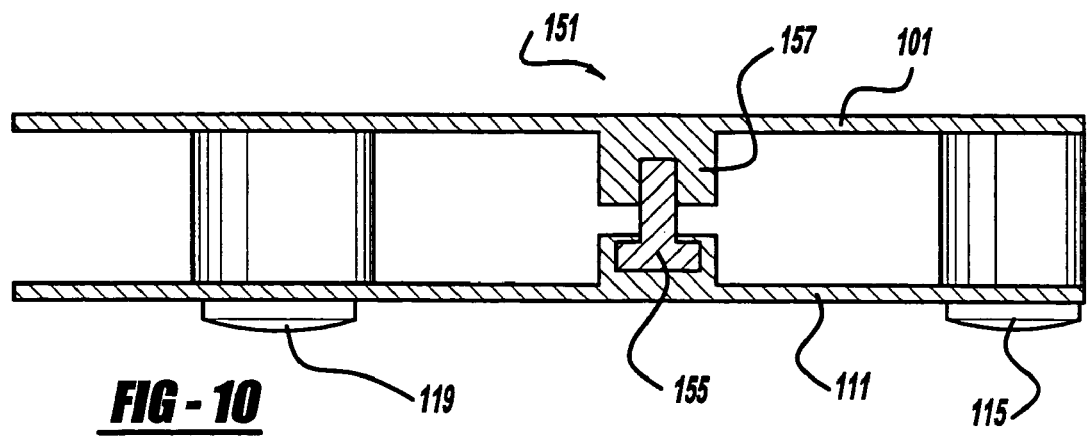
FIG. 10 is a cross sectional view, taken along line 10-10 of FIG. 8, showing the first preferred embodiment convertible roof system.

An automotive vehicle 51 having a convertible roof system of the present invention is shown in FIGS. 1-3. The convertible roof system employs a convertible roof 53 defined by a foldable top stack mechanism 55 which is externally covered by a pliable or flexible, soft-top cover 57, and a glass or PVC backlite or back window 59. Top stack mechanism 55 will be described hereinafter with regard to the right-hand side of the automotive vehicle as the majority of components are in mirrored symmetry on the left-hand side. Top stack mechanism 55 includes a front side roof rail 61, a center side roof rail 63 and a rear side roof rail 65. Side rails 61, 63 and 65 are all structural members which are elongated in a primarily fore-and-aft direction when in the fully raised position shown in FIGS. 1, 2, 3 and 5. FIG. 4 illustrates top stack mechanism 55 in a partially raised position and FIG. 6 shows top stack mechanism 55 in a fully retracted and open position.

FIGS. 2-4 show a pivotal hinge 71 and a pair of pivotally coupled, diagonal links 73 and 75 which define a four-bar B-pivot joint 77 between front side rail 61 and center side rail 63. A control link 79 has a first end pivotally coupled at the intersection of diagonal links 73 and 75 and has an opposite end pivotally connected to an upper and forward corner of rear side rail 65. An elongated balance link 81 has a first end pivotally coupled to a rearwardly projecting arm 83 extending from center side rail 63. An opposite end of balance link 81 has a pivot 85 pivotally coupled to a stationary bracket 87 affixed to an inner quarter panel of the vehicle body 89 or the like. Thus, the intersections between control link 79 to rear side rail 65 and arm 83 of center side rail 63 to balance link 81 define a C-pivot joint 91 between center side rail 63 and rear side rail 65. A reinforcement 93 has an upper end securely affixed to a lower section of rear side rail 65. An opposite end of reinforcement 93 is securely mounted to a sector gear 95, which in turn, is enmeshed with an output gear 97 automatically driven by an electric motor actuator 99. Alternately, top stack mechanism 55 can be automatically driven by a hydraulic actuator or even manually driven by the vehicle user without an actuator.

A forwardmost and number one roof bow 101 extends in a primarily cross-vehicle direction. Similarly, a number two roof bow 103 extends between the right-hand and left-hand side rail assemblies adjacent B-joint 77. Additionally second, third and fourth cross-vehicle roof bows (see FIG. 28) extend between the roof rail assemblies, and an optional number five roof bow (also see FIG. 28) may be provided along the rearmost edge of the convertible roof in an alternate embodiment. All of the roof bows are elongated structural members which support and are attached to pliable cover 57. A D-pivot joint 100 is defined at the lower interface between rear side rail 65 and bracket 87 rotatably coupled thereto.

Referring now to FIGS. 2, 7A and 8-10, each outboard end of number one bow 101 is rotatably coupled to each adjacent front side rail 61 at an A-pivot joint 105. Each A-joint is created by an L-shaped bracket 111 securely affixed to front side rail 61 by a nut and bolt, rivet, weld, integral casting or the like. A pivot bolt 115 projects from an inside surface of number one bow 101 and extends through a circular hole 117 in bracket 111. This bolt 115 defines a generally vertical pivot axis which allows generally horizontal and cross-vehicle movement of the coupled front side rail 61 relative to number one bow 101 (with the vertical and horizontal directions being viewed in the fully raised position of the convertible roof). A follower bolt 119 projects from the inside surface of number one bow 101 parallel to pivot bolt 115. Follower bolt 119 rides within an arcuate slot 121 of bracket 111 which is elongated along a generally horizontal plane when fully raised. Number one bow 101 is preferably cast from an aluminum or magnesium metal alloy and contains bosses which retain the threaded ends of bolts 115 and 119. A-joint 105 allows outfolding movement (which is defined herein to include converse infolding movement) of front side rail 61 relative to number one bow 101 during opening and closing of top stack mechanism 55 from the raised position of FIG. 5 to the retracted and open position of FIG. 6 upon energization of actuator 99 (see FIG. 4).

A lock assembly 151 and front header latch assembly 153 can best be observed in FIGS. 2, 7B and 8-10. Lock assembly 151 includes a locking bar 155 and a receptacle 157. Receptacle 157 is integrally formed within number one bow 101, and has a central slot defined by abutting walls for receiving a section of locking bar 155 therein. Alternately, receptacle 157 can be a separately attached part which may also include the bolt receiving bosses such that the extra part can be screwed or riveted directly to number one bow 101. Locking bar 155 is elongated in a cross-car direction and has an inverted T-cross sectional shape adjacent receptacle 157. Locking bar 155 further has an internally threaded nut section 159 which engages with an elongated drive screw 161 of header latch assembly 153. Drive screw 161 is externally threaded such that rotation thereof, caused by energization of an electric motor 163, causes locking bar 155 to linearly move and advance into engagement with or retract and disengage from receptacle 157. Electric motor 163 is centrally mounted on number one bow 101 adjacent a fore-and-aft extending centerline of vehicle. Electric motor 163 is connected to drive screw 161 by an elongated cable 165 through a drive nut 171, roller 173, cam 175 and various links 177. A hook-like front header latch 179 is caused to rotate into and out of engagement with a striker 181 affixed to a stationary, front header panel portion of body 51, in response to rotation of drive screw 161. Front header latch assembly 153 is firmly affixed to the inside surface of number one bow 101 and electric motor 163 simultaneously drives both the right-hand and left-hand front header latches and associated locking bars. Additional details of front header latch assembly 153 are found in co-pending U.S. Ser. No. 10/298,271 entitled "Convertible Top Latch" which was invented by Stephen Doncov and filed on Nov. 14, 2002, which is incorporated by reference herein. Nevertheless, a lost motion slot 183 or other lost motion coupling is provided within front header latch assembly 153 to allow drive screw 161 to continue rotating and linearly advancing locking bar 155 even after front header latch 179 is fully engaged with striker 181.

Lock assembly 151 advancement causes locking of A-joint 105 in order to deter and essentially prevent rotational movement of each front side rail 61 relative to number one bow 101 when the convertible roof is fully raised, thereby adding significantly increased structural rigidity to top stack mechanism 55. This also serves to reduce unwanted vibration and noise between top stack mechanism members and assists in maintaining a consistent weatherstrip-to-window sealing surface along the side rail members. Conversely, disengagement of locking bar 155 from receptacle 157 unlocks A-joint 105 and allows outfolding of the side rail members during retraction of the convertible roof. Thus, locking bar 155 and receiver 157 act as a dead bolt locking mechanism. Locking assembly 151 is considered to be an active and automatically operated locking device due to electromagnetic actuation of electric motor 163 which is envisioned to be controlled by proximity switches, limit switches, hall-effect sensors or potentiometers sensing the position of the convertible roof relative to the vehicle body and/or other roof components and allowing an electronic control unit, such as a microprocessor, to automatically energize and deenergize electric motors 163 and main drive motor 99.

Figure 11:
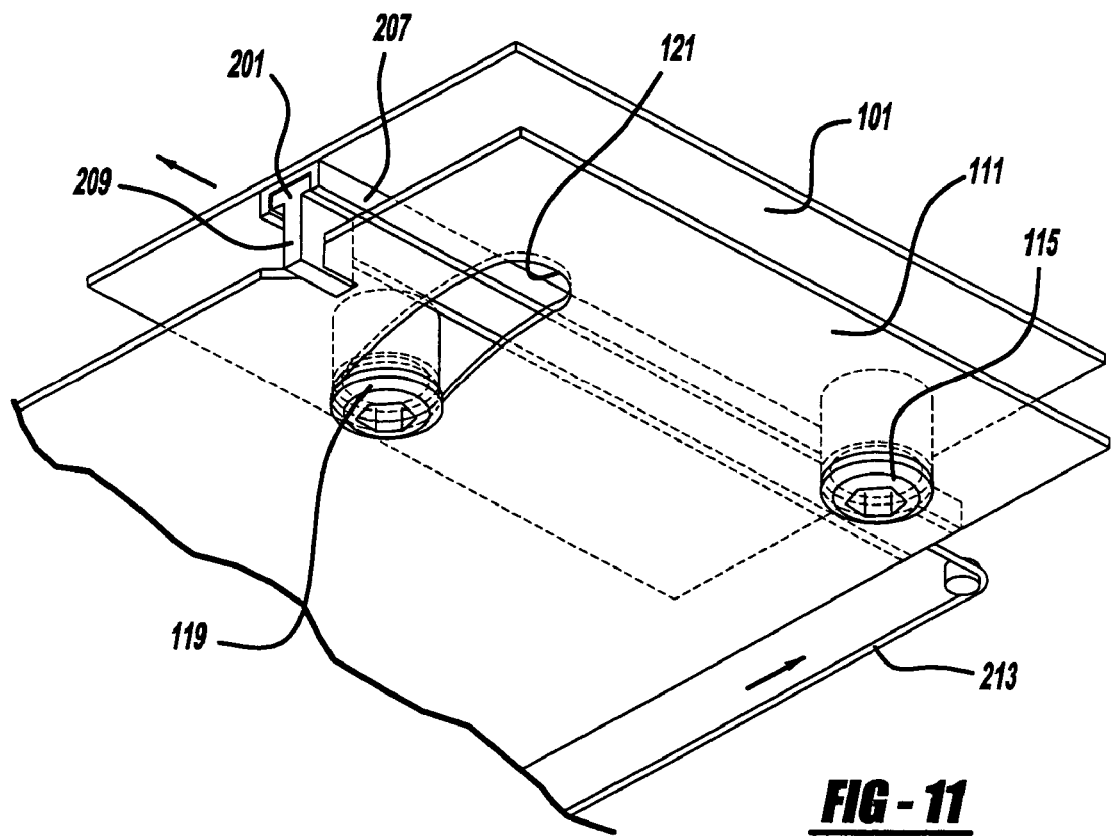
FIGS. 11 and 12 are perspective views, with a bracket and bow shown diagrammatically, showing a second preferred embodiment convertible roof system.
Figure 12:
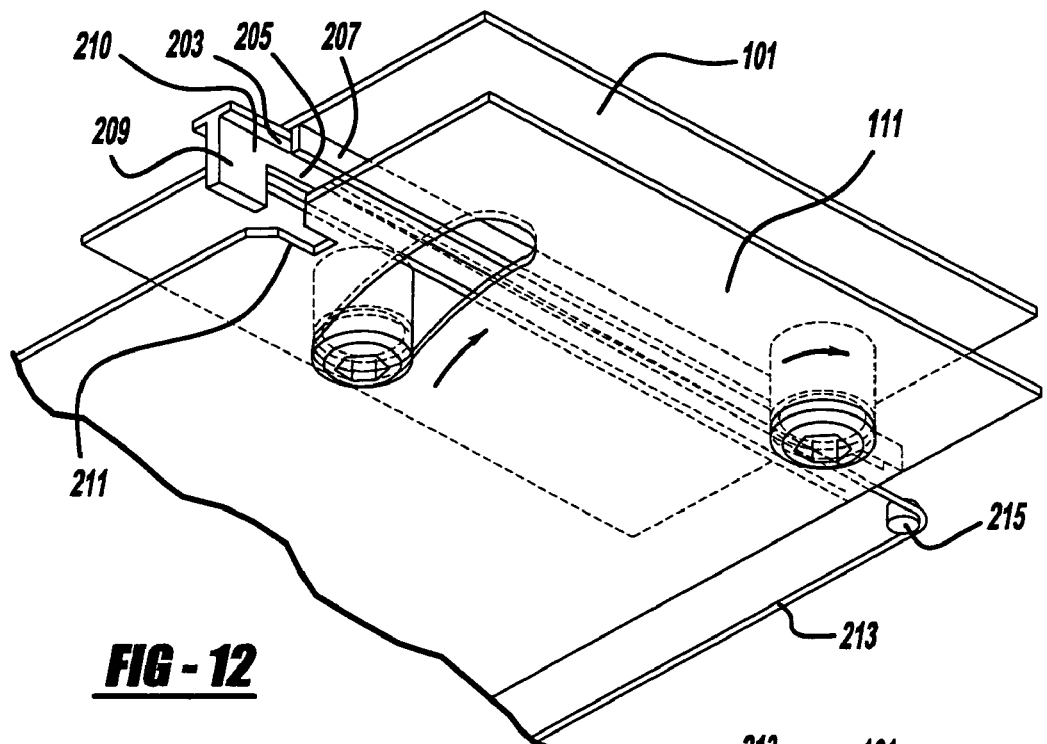

FIGS. 11 and 12 show a second preferred embodiment lock assembly of the present invention system. This exemplary lock system is substantially like that of the first preferred embodiment and preferably used to secure the A-joint, however, a locking bar 201 is somewhat differently configured to have an elongated base 203 and an upstanding central rib 205 defining a generally T-cross sectional shape 210. Base 203 rides within a groove of a receptacle 207 attached to number one bow 101. A tab 209 is aligned with central rib 205 and further extends downward from a distal end of locking bar 201. Tab 209 operably moves to engage and disengage a chamfered, slot-like receptacle 211 in an edge of bracket 111 affixed to and movable with the front side rail. An elongated Bowden cable 213 is connected to a proximal end of locking bar 201 and linearly drives locking bar 201 into and out of locking engagement with receptacle 211 based on either active or passive actuation of cable 213. FIG. 11 shows the lock assembly in the joint locking mode thereby essentially preventing movement of the front side rail relative to the number one roof bow. FIG. 12, however, shows the lock assembly in a disengaging and unlocked mode thereby allowing rotation and outfolding of the joined members. It is noteworthy that this second preferred embodiment preferably provides tab 209 of locking bar 201 rearward in the vehicle relative to a cable pulley 215 and employs an electric motor, solenoid or even a manually actuated handle, attached to the number one bow, to push and/or pull the cable. Accordingly, locking bar 201 of the second preferred embodiment linearly slides in a generally fore-and-aft vehicular direction while locking bar 155 (see FIGS. 7A-9) linearly slides in a generally cross-vehicle direction.

Figure 13:
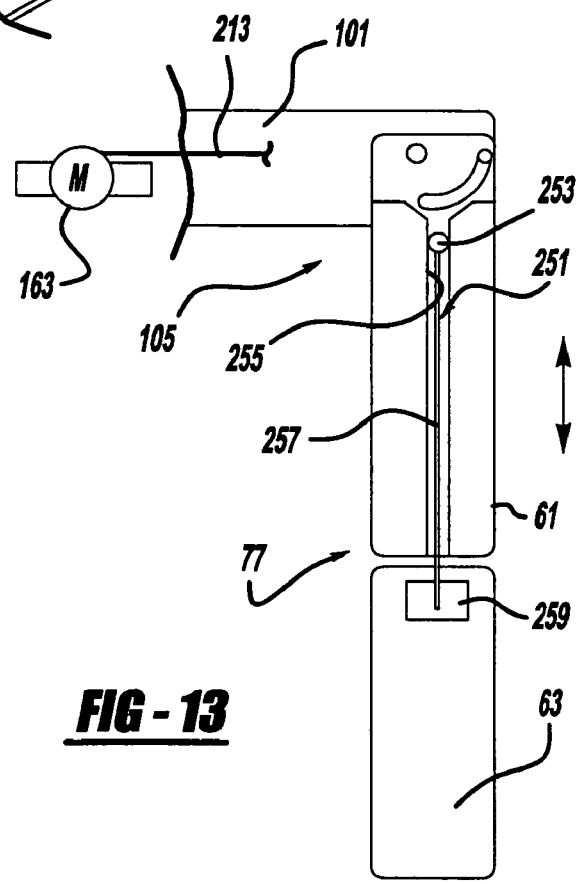
FIGS. 13 and 14 are top diagrammatic views showing variations of a third preferred embodiment convertible roof system.
Figure 14:
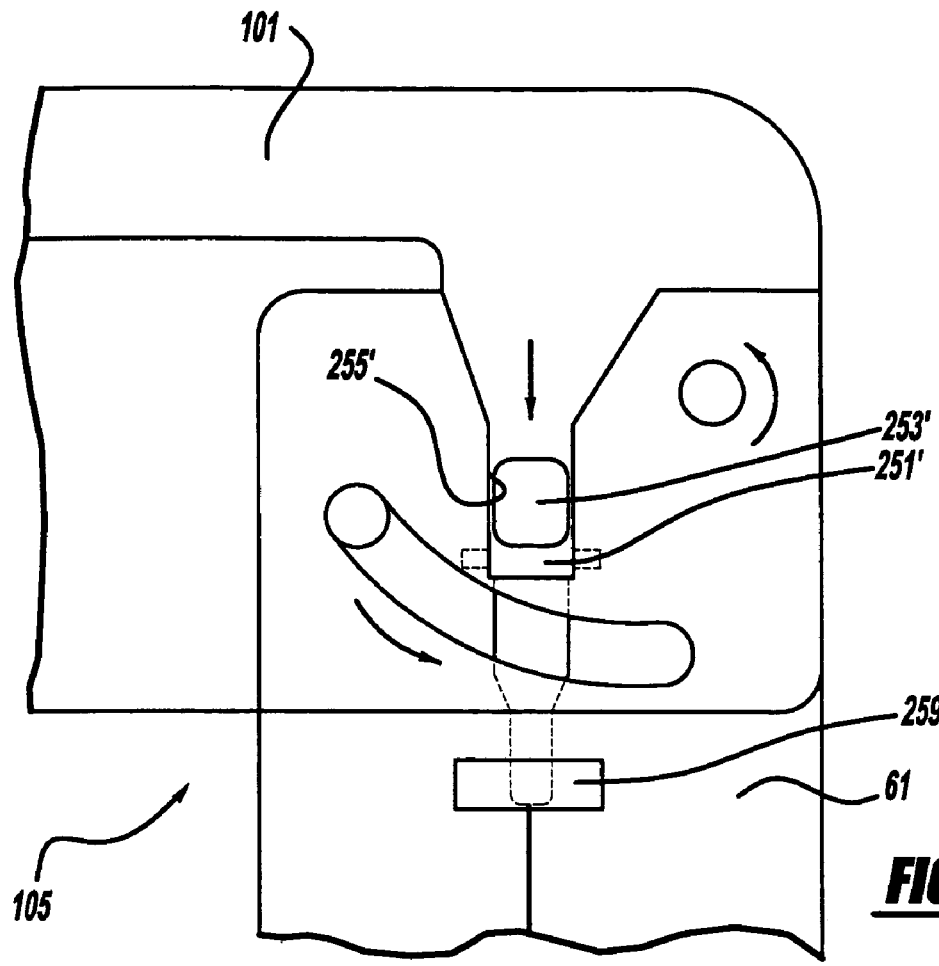
Figure 15:
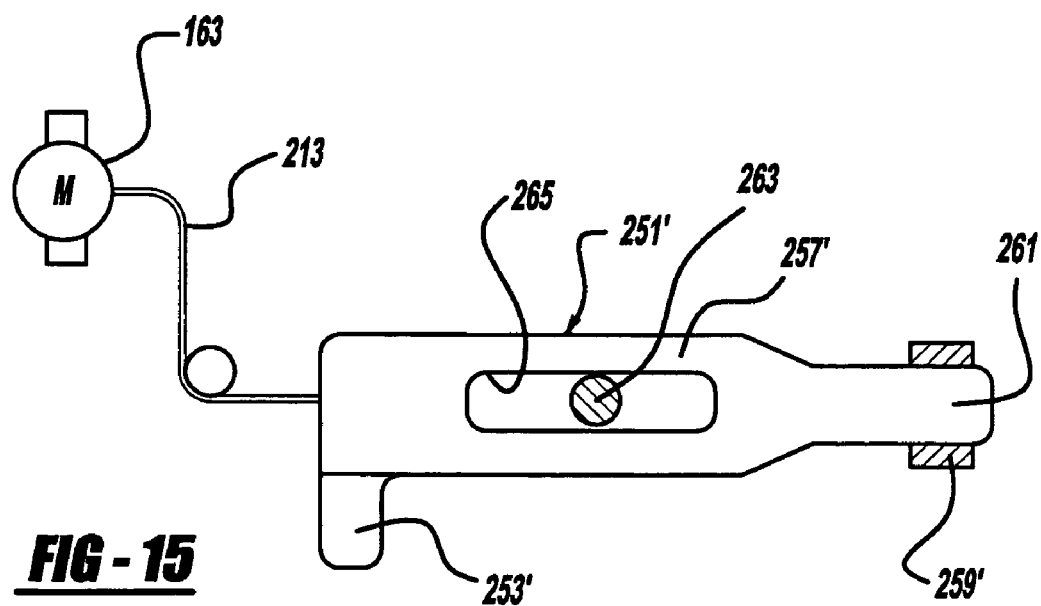
FIG. 15 is a side diagrammatic view showing a portion of a variation of the third preferred convertible roof system.

Variations of a third preferred embodiment convertible roof system are illustrated in FIGS. 13-15. With this embodiment, a locking bar 251 and 251' has an upstanding tab 253 and 253' which is linearly movable in a generally fore-and-aft vehicular direction in response to energization of an electric motor 255 and 255' mounted to number one roof bow 101. An elongated cable 213 is pushed or pulled by electric motor 163 which is, in turn, connected to a proximal end of locking bar 251 and 251' so that upstanding tab 253 and 253' can lockingly engage within a snugly fitting and slotted receptacle 255 and 255' mounted to and aligned with front side rail 61. The figures show locking bar 251 and 251' engaged with receptacle 255 and 255' in order to lock A-joint 105 and prevent it from rotating or otherwise moving. A body 257 of locking bar 251 (see FIG. 13) is a longitudinally elongated rod which also engages a secondary receptacle 259 secured to center side rail 63 thereby also simultaneously locking and unlocking B-joint 77. For the variation of FIGS. 14 and 15, a body 257' of locking bar 251' includes a rearwardly facing and narrower nose section 261 which is engagable with a secondary receptacle 259' securely mounted to front side rail 61 for added locking stability and strength or, alternately, to a center side rail. A guide pin 263 projects through an internal slot 265 of locking bar 251' and is mounted to either number one bow 101 or front side rail 61 to further provide proper orientation and movement to locking bar 251' throughout its linear range of motion.

Figure 16:
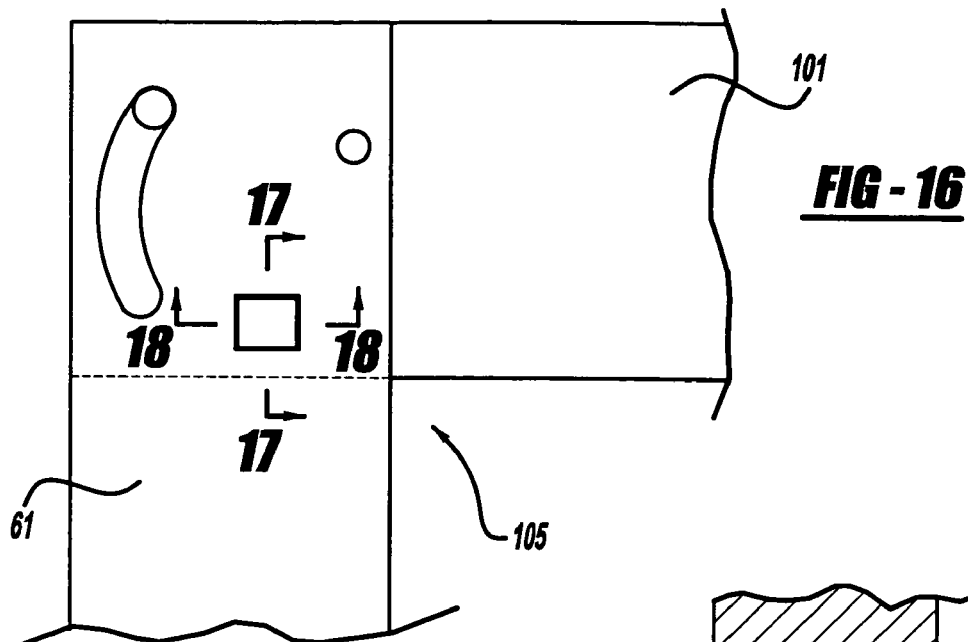
FIG. 16 is a top diagrammatic view showing a fourth preferred embodiment convertible roof system.
Figure 17:
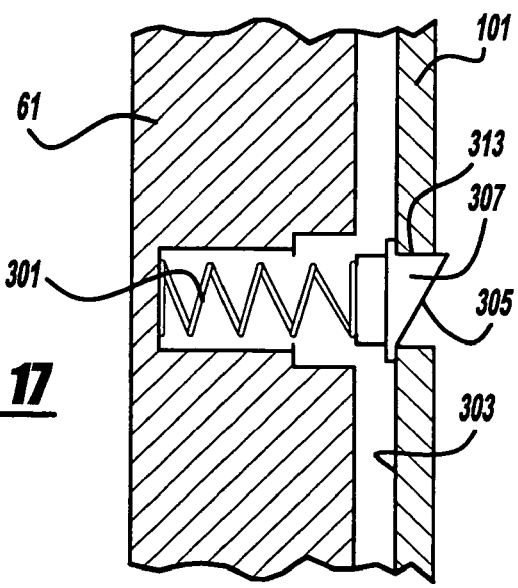
FIG. 17 is a cross sectional view, taken along line 17-17 of FIG. 16, showing the fourth preferred embodiment convertible roof system.
Figure 18:
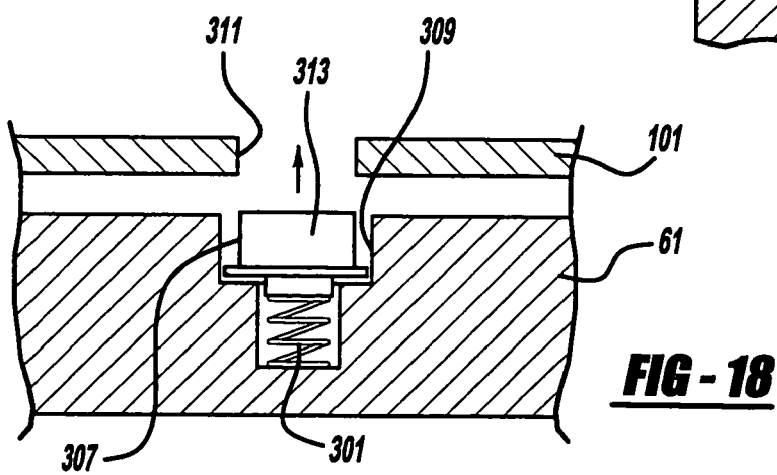
FIG. 18 is a cross sectional view, taken along line 18-18 of FIG. 16, showing the fourth preferred embodiment convertible roof system.

A fourth preferred embodiment system can be observed in FIGS. 16-18 wherein an outfolding A-joint 105 between number one bow 101 and front side rail 61 is locked or unlocked through passive movement of number one roof bow member 101 relative to front side rail member 61, aided by a biasing member 301, here a compression spring. When one of the members is offset relative to the other of the members, a surface 303 will ride along an angular ramp surface 305 of a locking button 307. This will cause locking button 307 to compress biasing member 301 and cause locking button 307 to sit in a recessed pocket 309 of front side rail 61 or a component attached thereto. When one member rotates relative to the other member, such that a receptacle-like hole 311 in number one bow 101 is aligned with pocket 309, biasing device 301 will vertically urge locking button 307 into hole 311. Thereafter, an abutting surface 313 of locking button 307 prevents undesired rotation in a predetermined direction by abutting against an inside edge defining hole 311. Alternately, ramp surface 305 can be excluded such that all four sides of locking button 307 are parallel and act as abutting surfaces against the inside edges of hole 311 thereby securing the members together in all directions when engaged; disengagement would occur through the user manually pushing each button 307 or through an elongated cable and pulley arrangement (not shown for this embodiment but similar to that shown in FIG. 15) withdrawing locking button 307 back into pocket 309, actuated by disengagement of a manually actuated front header latch mounted to number one bow 101.

Figure 19:
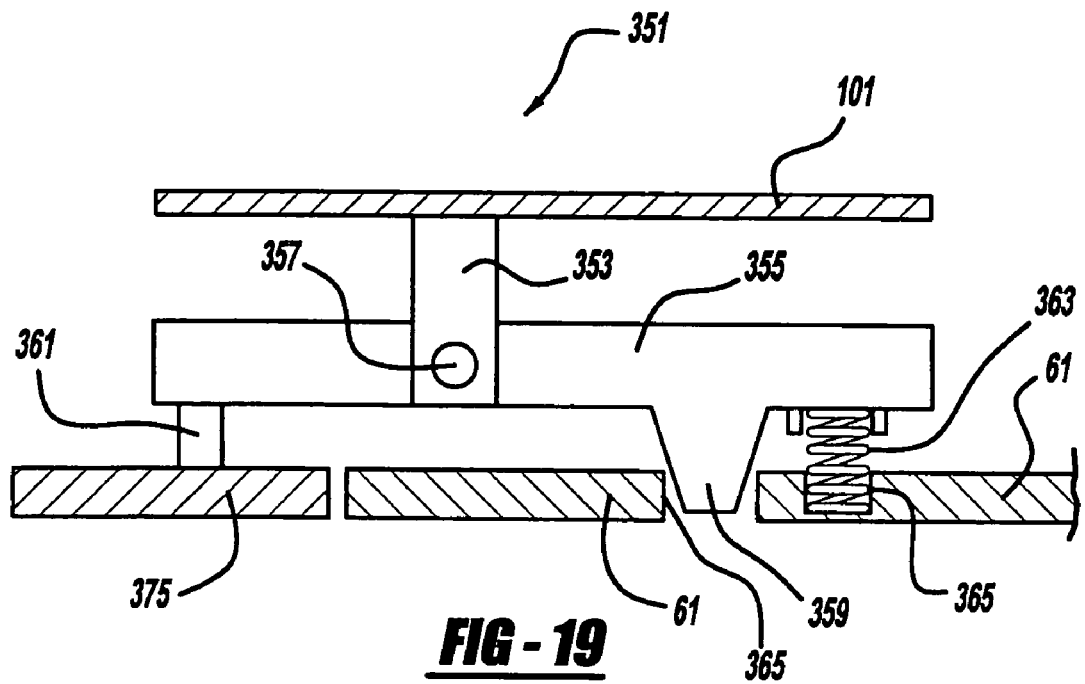
FIGS. 19 and 20 are diagrammatic and cross sectional views, taken along a fore-and-aft and vertical plane, showing a first alternate embodiment convertible roof system.
Figure 20:
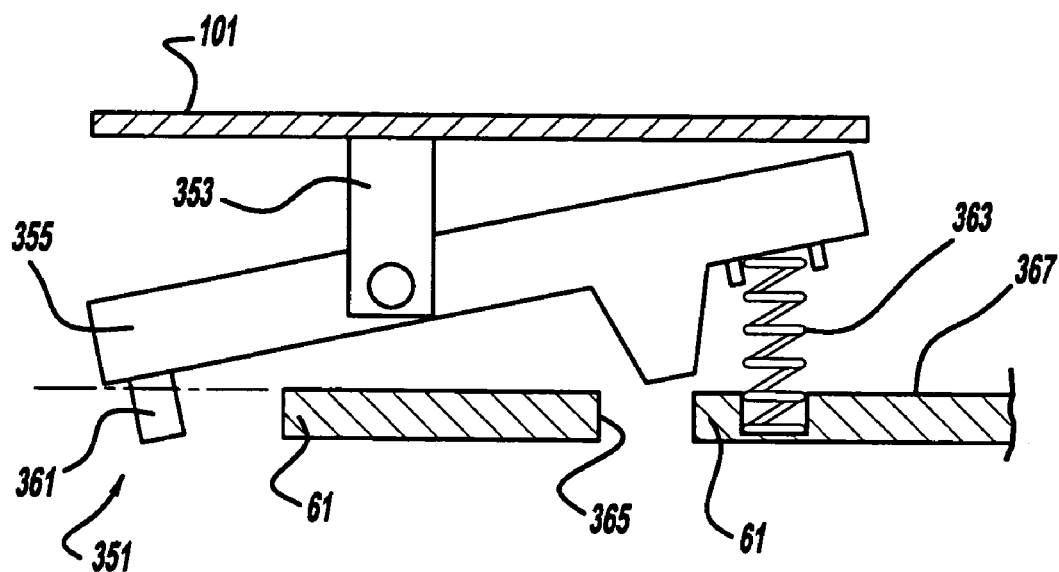

A first alternate embodiment lock assembly 351 for an A-joint is shown in FIGS. 19 and 20. Lock assembly 351 employs a downwardly extending bracket 353 affixed to the inside surface of number one roof bow 101. A lock includes a lever arm 355 pivoting about a fulcrum-like pivot pin 357 coupled to bracket 353. A lock insert section 359 depends from lever arm 355 and a rubber bumper 361 depends from an end of lever arm 355 opposite fulcrum pin 357. A compression spring 363 is secured within a pocket 365 of front side rail 61, although a torsion spring may alternately be located at fulcrum pin 357. Accordingly, FIG. 20 shows lock assembly 351 in an unlocked orientation with compression spring 363 operably urging lever arm 355 into a rotated position with insert section 359 withdrawn from a mating receptacle-like hole 365 in front side rail 61. Bumper 361 is thereby allowed to rotate past a generally horizontal plane defined by an upper surface 367 of front side rail 61 so that front side rail 61 is free to rotate in an inboard and an outboard, cross-vehicle manner relative to number one bow 101. FIG. 19 shows the condition where the top stack mechanism is moved to its fully raised position which causes a stationary, front header panel 375 of the vehicle body to abut against bumper 361. This causes bumper 361 to downwardly rotate lever arm 355 to engage lock insert section 359 into abutting contact within the edges defining hole 365 in front side rail 61, thus, locking the A-joint in a passive manner through normal convertible roof movement. It should be appreciated that a leaf spring, foam, elastomeric material or other biasing device may be employed in place of compression spring 363 as some cross-car movement may be desired between compression spring and either the lock or front side rail 61.

Figure 21:
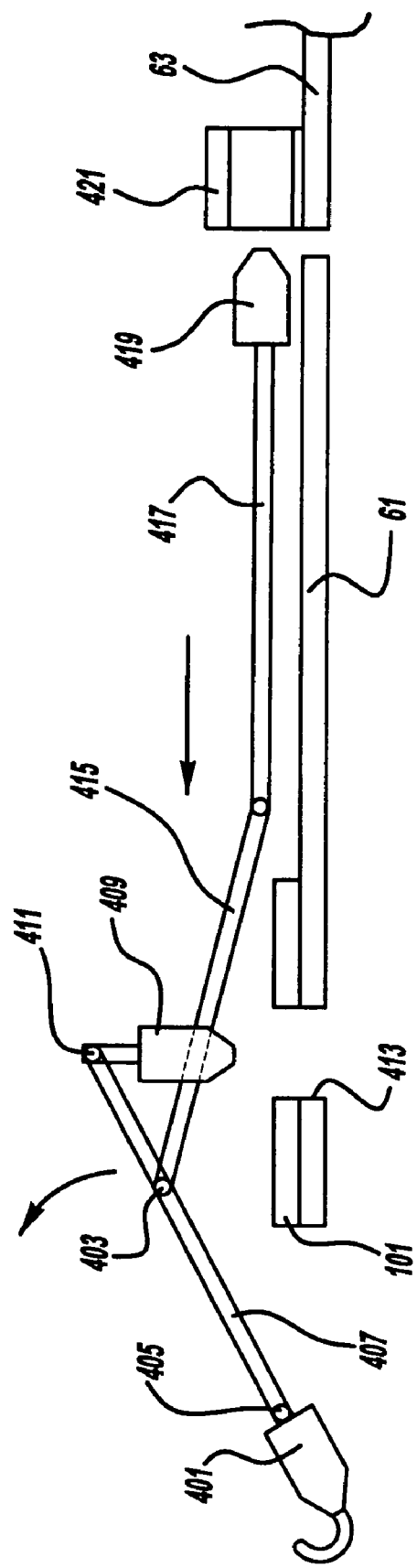
FIG. 21 is a side diagrammatic view showing a second alternate embodiment convertible roof system.

FIG. 21 illustrates a second alternate embodiment convertible roof system of the present invention. In this exemplary embodiment, a J-shaped and hook-like, front header latch 401 is coupled to number one roof bow 101, or alternately front side rail 61, and allowed to rotate along a generally fore-and-aft, vertical plane about a fulcrum-like elbow pivot 403 and a supplemental wrist pivot 405 connected to a first elongated link 407. Pivots 403 and 405 are coupled to the adjacent structural member by brackets or the like. A locking bar 409 is pivotally coupled at shoulder pivot 411 to an opposite end of link 407 to allow predominantly vertical advancing and retracting movement of locking bar 409 into the apertured receptacle 413 aligned in both number one bow 101 and front side rail 61 when they are in their fully raised positions. In an optional variation, a second elongated link 415 couples first link 407 to a third link 417. Third link 417 causes a second locking bar 419, attached thereto, to linearly slide into and out of engagement with a second receptacle 421 affixed to center side rail 63. It is envisioned that the links are operably driven by an electric motor or through a manually operated handle. First locking bar 409 serves to prevent movement of the A-joint while second locking bar 419 serves to prevent movement of the B-joint when the convertible roof is fully raised, in a simultaneously actuated manner.

Figure 22:
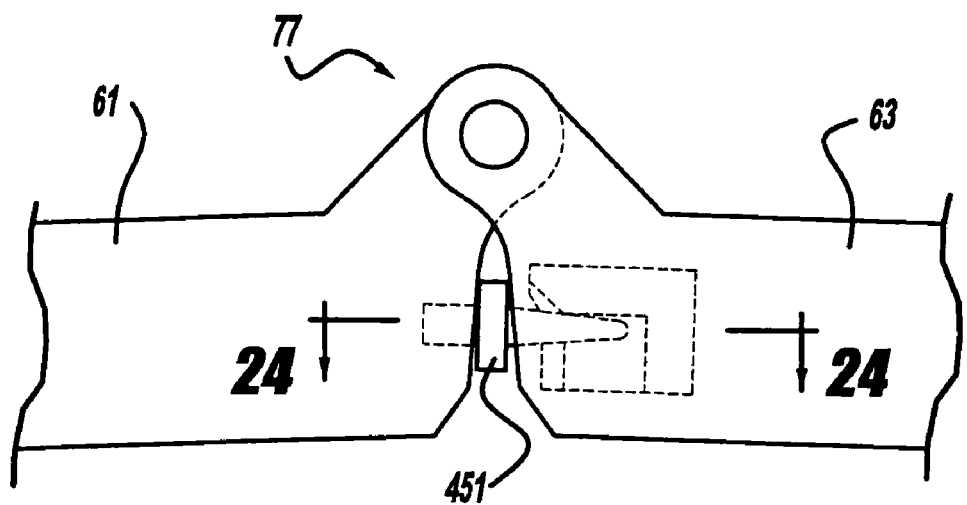
FIG. 22 is a side elevational view showing a fifth preferred embodiment convertible roof system.
Figure 23:
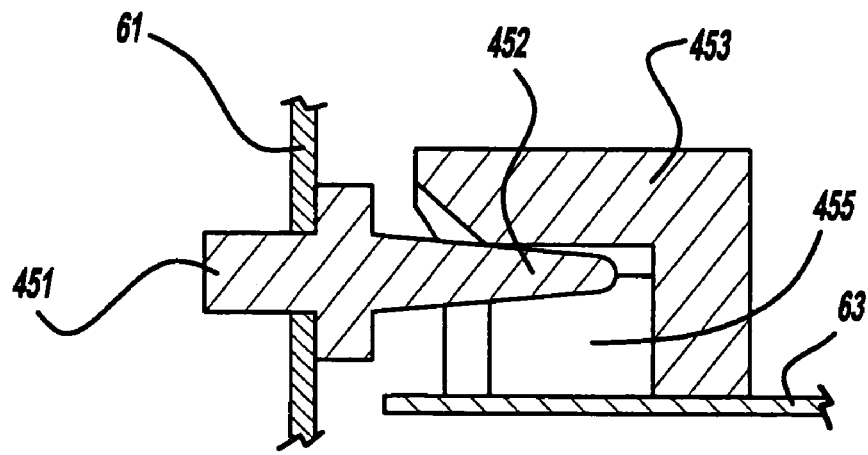
FIG. 23 is a cross sectional view, taken along line 23-23 of FIG. 24, showing the fifth preferred embodiment convertible roof system.
Figure 24:
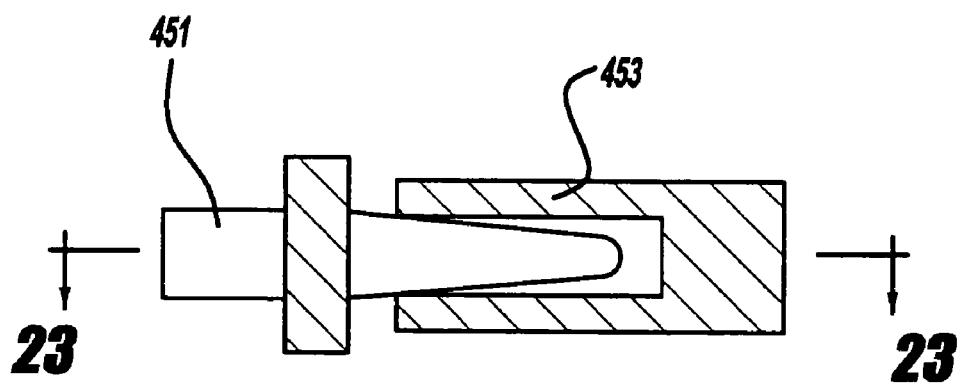
FIG. 24 is a cross sectional view, taken along line 24-24 of FIG. 22, showing the fifth preferred embodiment convertible roof system.

A fifth preferred embodiment of the convertible roof system of the present invention is shown in FIGS. 22-24 wherein a passive locking system is employed. A dowel pin 451 is affixed to a flange of front side rail 61 such that a tapered finger 452 is rearwardly extending when the convertible roof is fully raised. A dog house-like receptacle 453 has a hollow, internal cavity 455 operable to receive finger 452 of dowel pin 451 when in the locking condition with the convertible roof fully raised. This serves to deter movement in B-joint 77. It should be appreciated that this passive locking device can also be identically employed at the C and D-joints as well. The locking system of this embodiment deters joint movement in the cross-vehicle direction and vertical direction.

Figure 25:
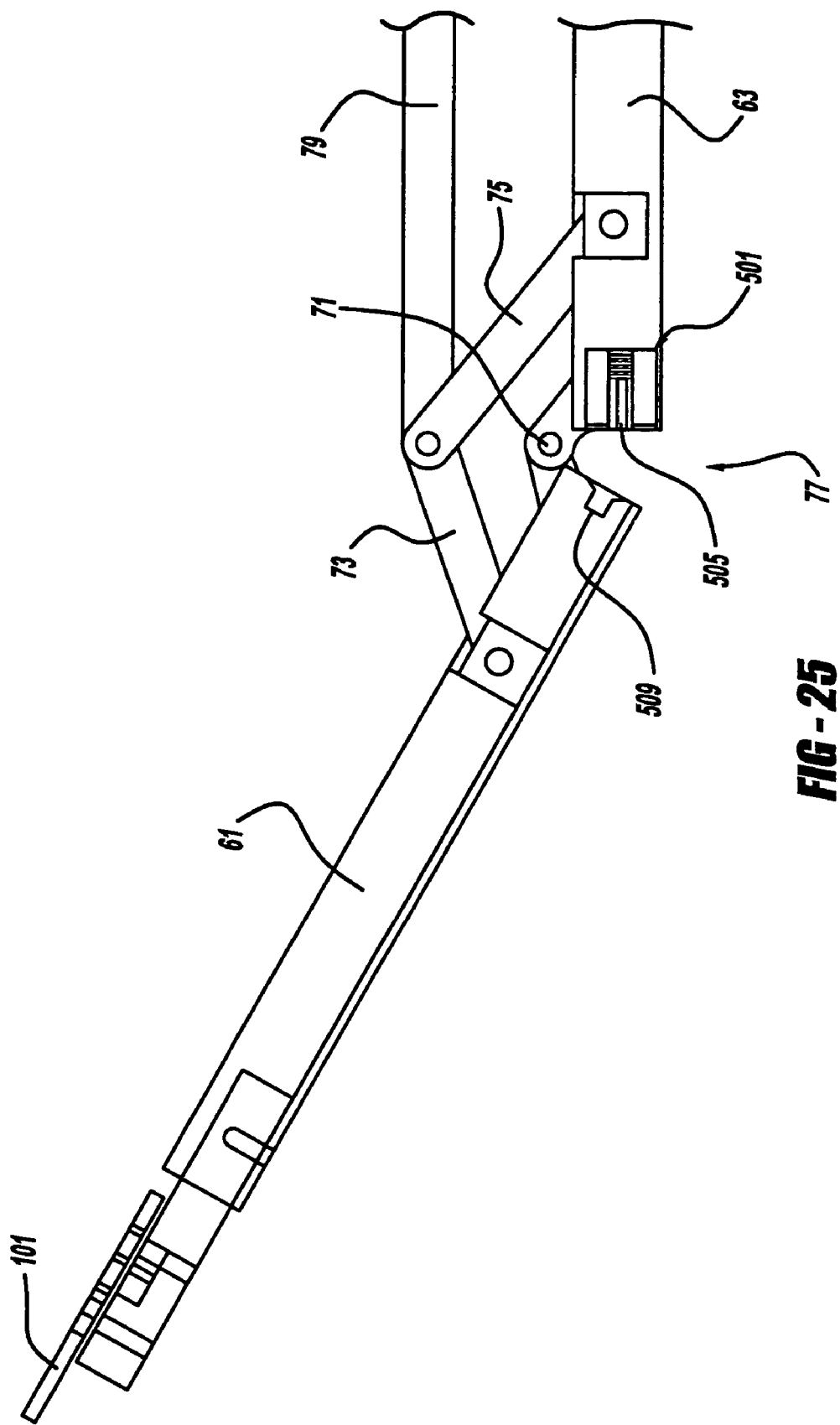

Referring now to FIGS. 25-27, a third alternate embodiment convertible roof system employs a locking system having an electromagnetic solenoid 501 coupled to either front side rail 61 or center side rail 63 for operably locking B-joint 77. Solenoid 501 includes coiled wire 503 and a linearly movable plunger acting as a locking bar 505. An outer conductive can or solenoid housing can be employed and a compression spring 507 is located in the aperture within conductive wire 503 operably biasing locking bar 505 in an outwardly extending and locking orientation (as shown in FIG. 26). A receptacle 509 is affixed to the other of the front or center side rails. Receptacle 509 operably receives the distal end of locking bar 505 when in the locking condition which is when the convertible roof is fully raised. Accordingly, energization of wire 503 electromagnetically retracts locking bar 505 to unlock B-joint 77 and deenergization of the solenoid allows spring 507 to urge locking bar 505 into engagement with receptacle 509 and lock the joint in the desired condition, in an actively driven manner. A microprocessor control unit for the convertible roof will automatically cause the solenoid to be appropriately energized or deenergized depending on the sensed position of the convertible roof and/or the vehicle user control signals sent for raising or lowering the convertible roof. It should be appreciated that this solenoid-type locking system can be employed with any of the convertible roof joints.

Figure 28:
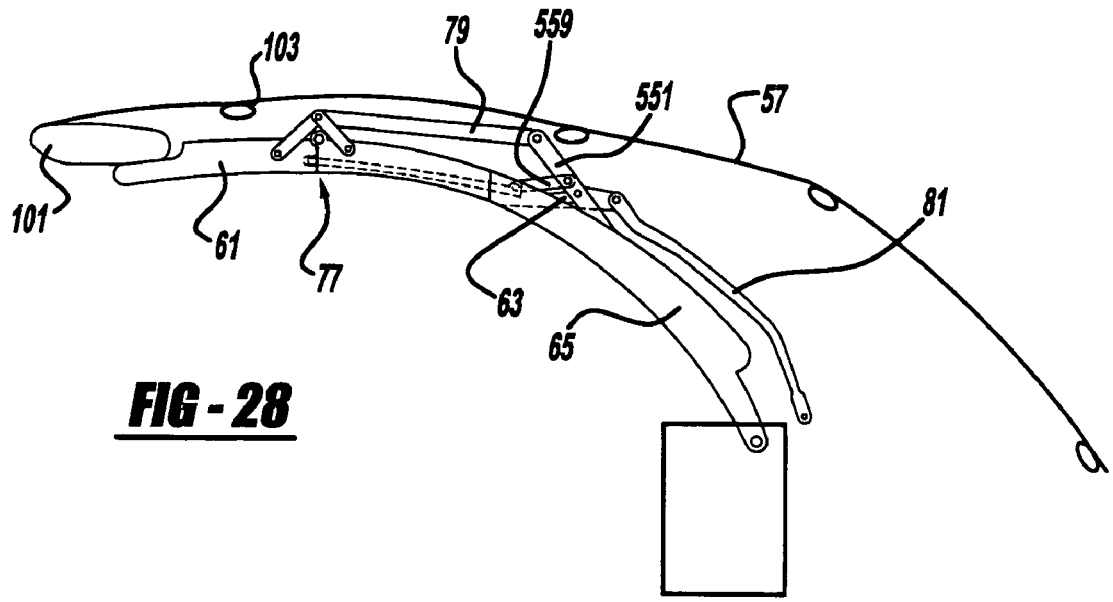
FIG. 28 is a side diagrammatic view showing a sixth preferred embodiment convertible roof system.
Figure 29:
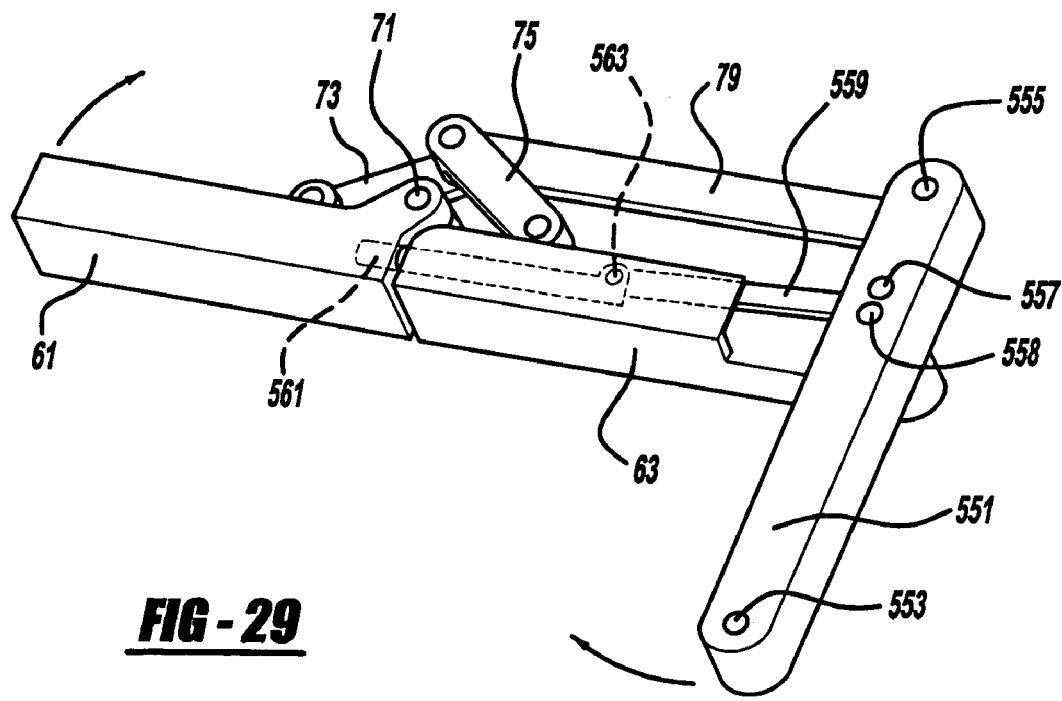
FIGS. 29 and 30 are perspective views showing the sixth preferred embodiment convertible roof system in fully raised and partially retracted positions, respectively.
Figure 30:
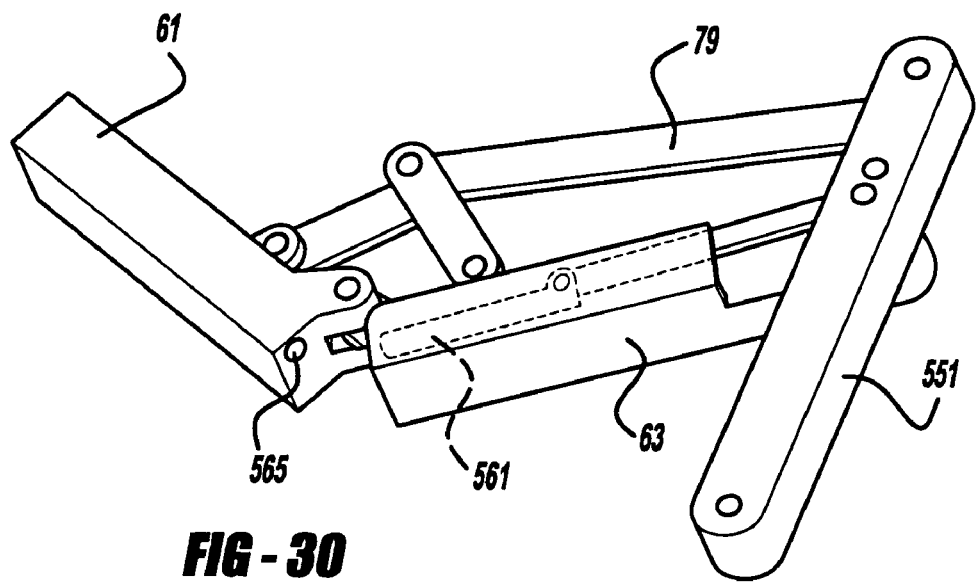

Reference should now be made to FIGS. 28-30. A sixth preferred embodiment system employs a passively driven locking configuration with a driving link 551 having a first pivot 553 pivotally coupled to and driven by rear side rail 65. An opposite pivot 555 of driving link 551 is coupled to and drives control link 79, which in turn, causes rotation of front side rail 61 relative to center side rail 63. A central pivot 557 of drive link 551 is coupled to a push rod 559 at one end while an opposite end is coupled to an elongated locking bar 561 at pivot 563. A fulcrum-like pivot 558 rotatably couples driving link 551 to an arm rearwardly projecting from center side rail 63. Accordingly, normal movement of the top stack mechanism and convertible roof from the partially raised position shown in FIG. 30, to the fully raised, shown in FIGS. 28 and 29, causes locking bar 561 to be linearly extended in a generally fore-and-aft direction for snug engagement within a receptacle 565 in front side rail 61, thereby providing cross-vehicle and generally vertical locking engagement. A lost motion, slotted coupling may be needed depending upon geometric motions required of the top stack mechanism on a vehicle-to-vehicle basis.

Figure 31:
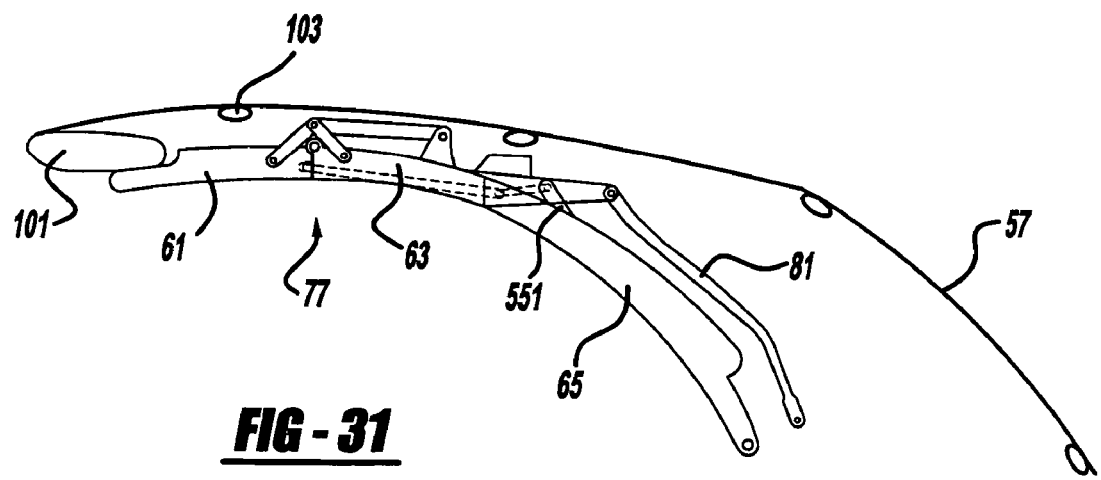
FIG. 31 is a side diagrammatic view showing a seventh preferred embodiment convertible roof system.
Figure 32:
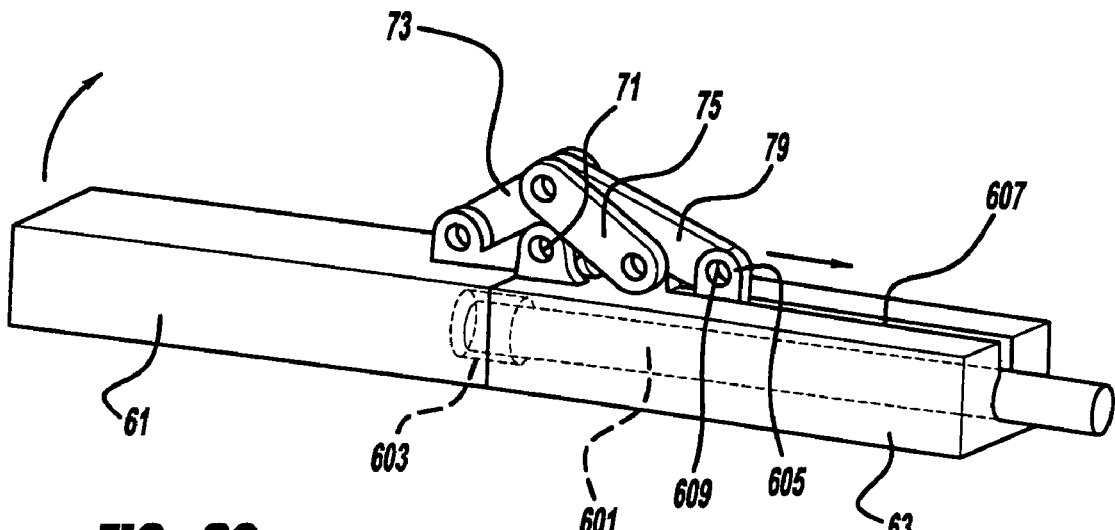
FIGS. 32 and 33 are perspective views showing the seventh preferred embodiment convertible roof system in fully raised and partially retracted positions, respectively.
Figure 33:
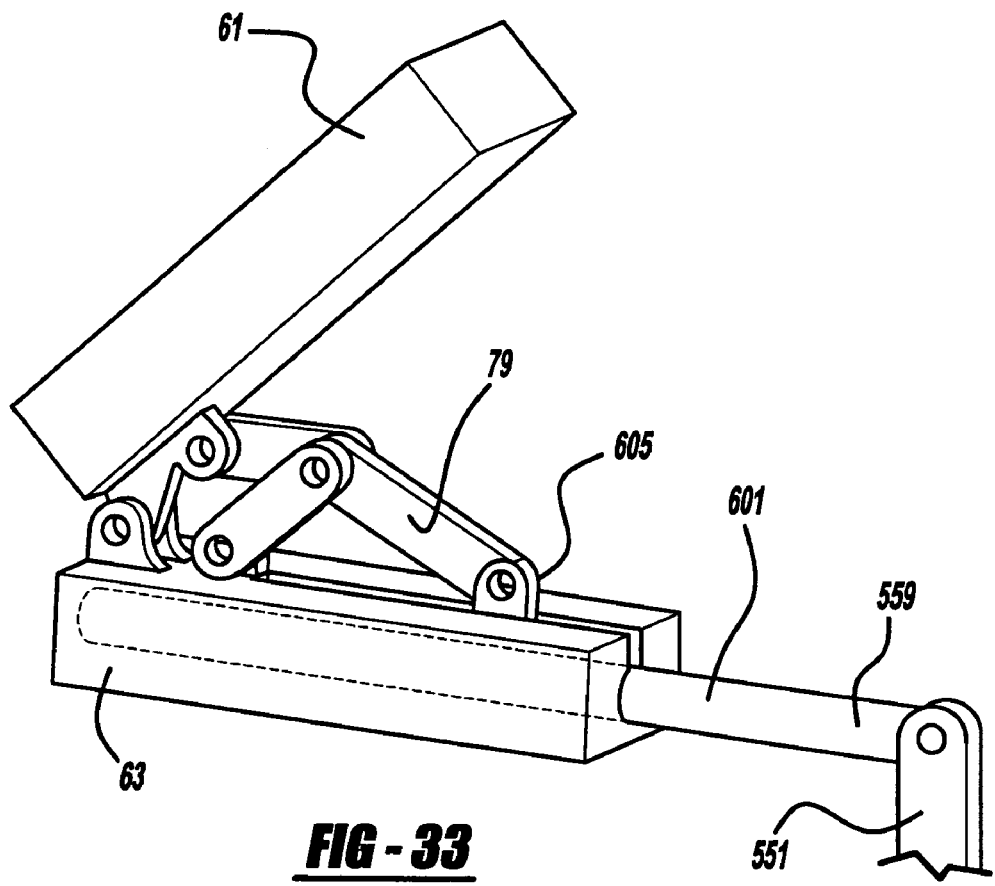

Furthermore, FIGS. 31-33 disclose a seventh preferred embodiment system of the present invention employing another passive locking configuration to lock B-joint 77. In this construction, a linearly moving locking bar 601 slides in a generally fore-and-aft direction within a passageway internal to center side rail 63. In its locking condition with the convertible roof fully raised, a distal end of locking bar 601 is received within a mating receptacle 603 disposed in front side rail 61. Locking bar 601 is driven by a push rod 559 pivotally coupled thereto which is also pivotally coupled to and driven by drive arm 551 which is affixed to rear side rail 65 for concurrent movement therewith. An upstanding tab 605 projects from the middle portion of locking bar 601 and freely slides within an elongated slot 607 in center side rail 63. Tab 605 concurrently moves with locking bar 601 and operably drives control link 79 in order to operate B-joint 77 when locking bar 601 is withdrawn. A lost motion pivot and slot coupling may be required at the connection 609 between tab 605 and control link 79 or at another suitable location in order to allow some initial unlocking movement before the B-joint is rotated.

Figure 34:
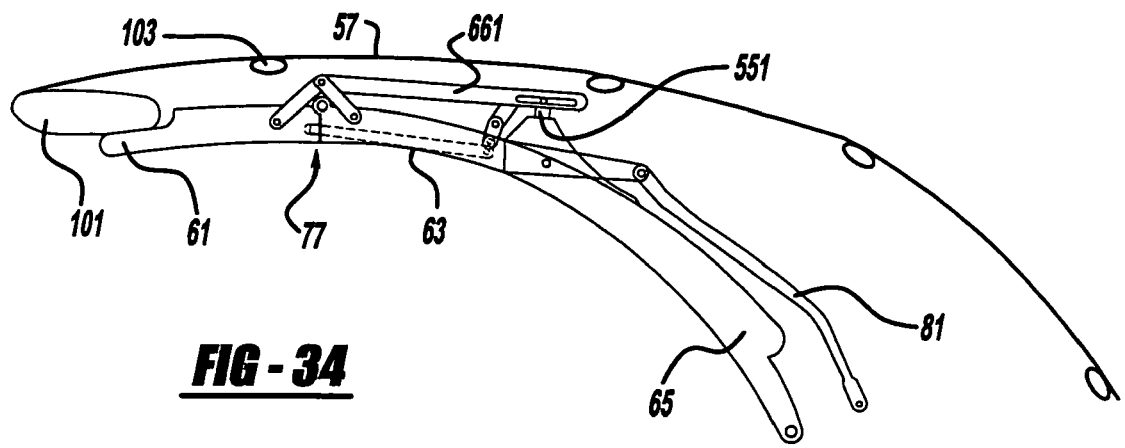
FIG. 34 is a side diagrammatic view showing an eighth preferred embodiment convertible roof system.
Figure 35:
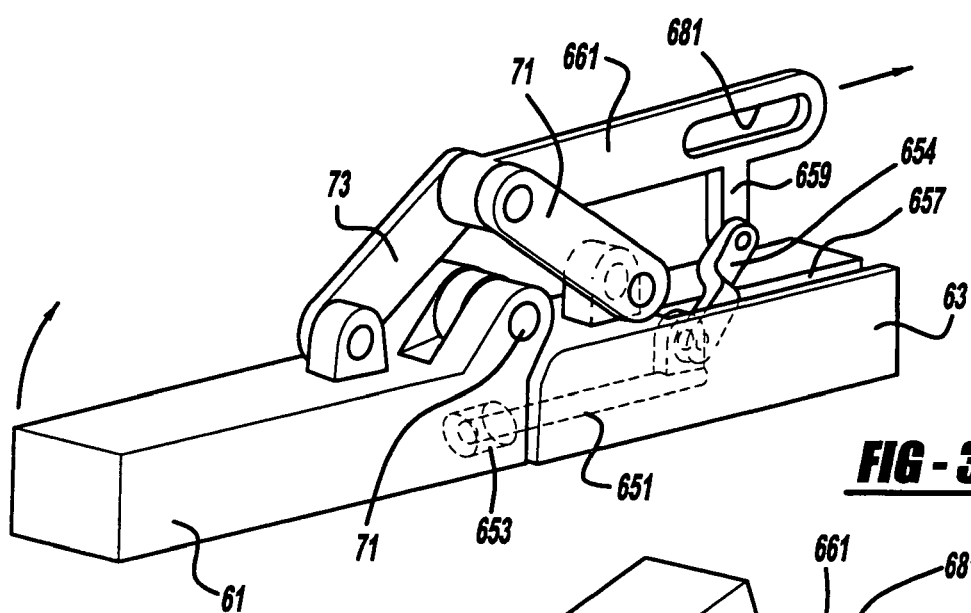
FIGS. 35 and 36 are perspective views showing the eighth preferred embodiment convertible roof system in fully raised and fully retracted positions, respectively.
Figure 36:
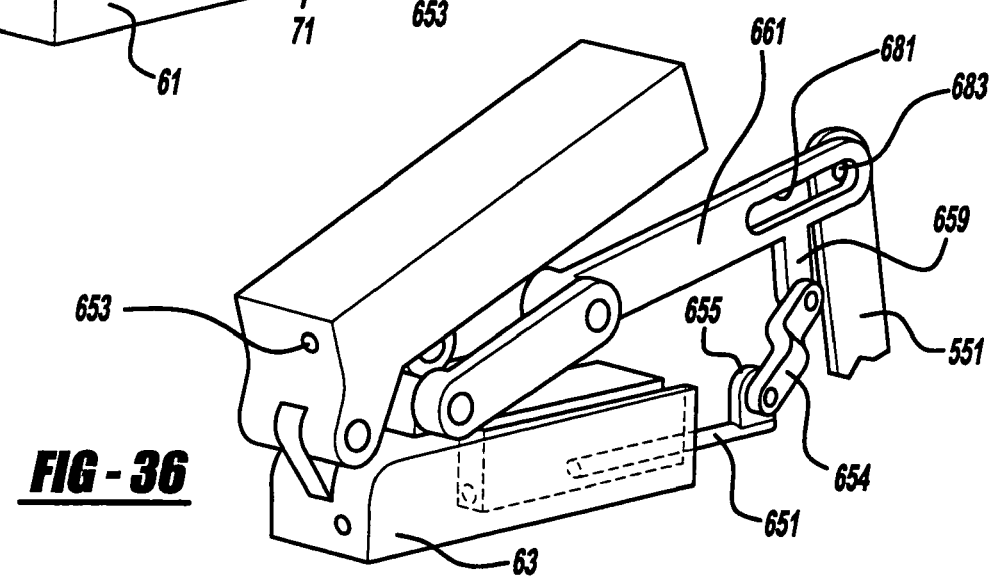

Referring now to FIGS. 34-36, an eighth preferred embodiment of the present invention system provides yet another passive locking apparatus. A linearly sliding locking bar 651 is movable in a passageway within center side rail 63 for locking engagement with a receptacle 653 located in front side rail 61, as shown in FIGS. 34 and 35, when the convertible roof is in its raised position, or disengaged therefrom, when in its lowered position, as shown in FIG. 36. A push link 654 has one end connected to an upstanding tab 655 affixed to locking bar 651 and linearly slidable within a center side rail slot 657. An opposite end of push link 654 is rotatably coupled to a downwardly extending flange 659 attached to a control link 661. Control link 661 is rotatably coupled to diagonal hinge links 73 and 75 in order to operate B-joint 77. A lost motion connection is provided between an elongated slot 681 internal to control link 661 and the interfacing follower pin 683 attached to an end of drive link 551. Drive link 551 has its opposite end affixed to rear side rail 65. Thus, locking bar 651 is selectively disengaged from its locking position prior to significant movement of the corresponding joint between the side rails.

Figure 37:
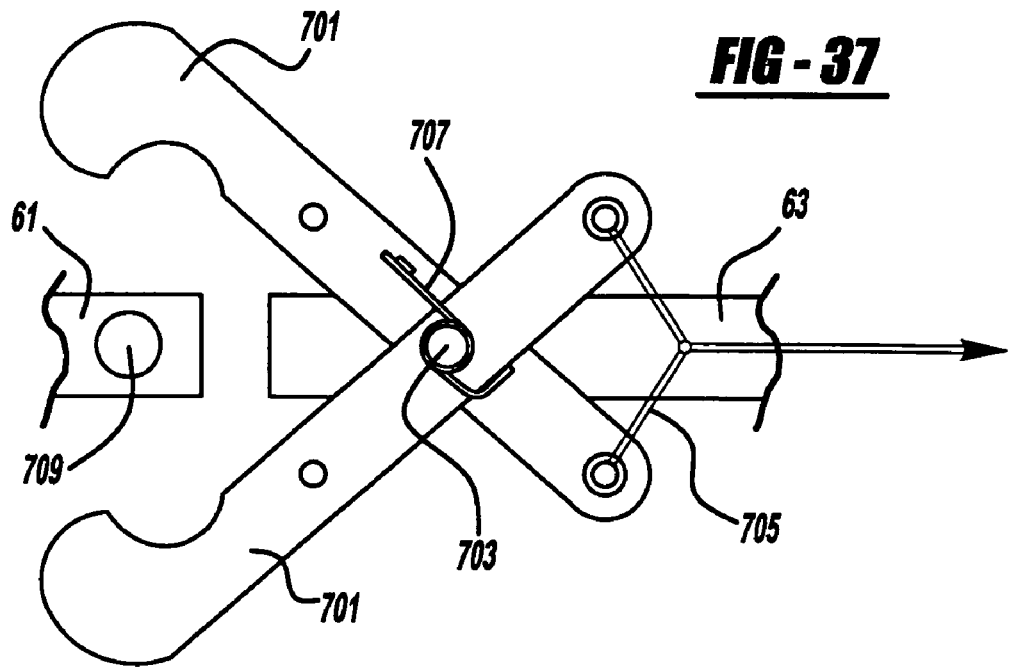
FIGS. 37 and 38 are diagrammatic side views showing a fourth alternate embodiment convertible roof system in unlocked and locked positions, respectively.
Figure 38:
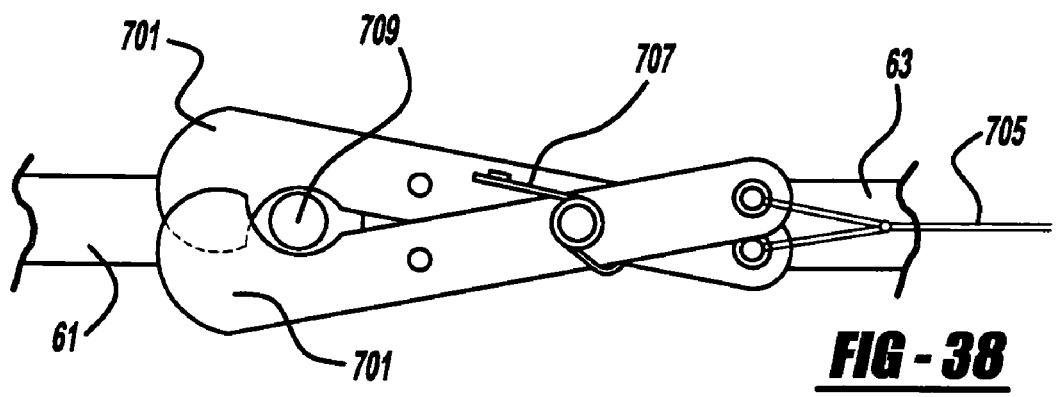
Figure 39:
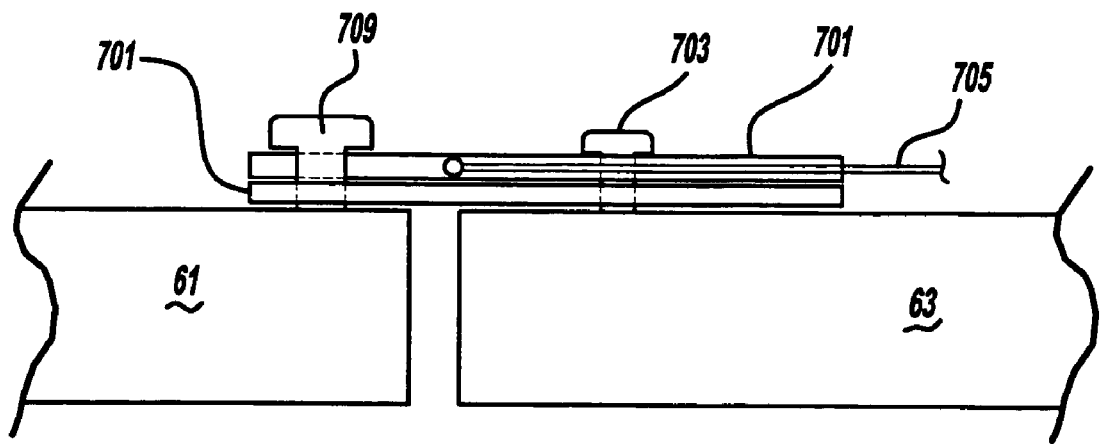
FIG. 39 is a diagrammatic top view showing the fourth alternate embodiment convertible roof system in a locked position.

Finally, FIGS. 37-39 show a fourth alternate embodiment system of the present invention which can be employed in a passive or actively actuated manner for any of the top stack mechanism joints. In this exemplary embodiment, a pair of locking jaws 701 are rotatably coupled to center side rail 63 at pivot 703. One or more elongated and flexible cables 705 are connected to driving ends of jaws 701 in order to rotatably pull jaws 701 to their closed and locked position surrounding the shaft of a striker-type receptacle 709 affixed to front side rail 61, as shown in FIGS. 38 and 39. A biasing member, such as the illustrated torsion spring 707, serves to bias jaws 701 open and in the unlocked position, as shown in FIG. 37. This locking system provides three-dimensional locking between the adjacent side rails, if the jaw fits tightly with regard to the striker and all directions.

While various embodiments of the locking system and convertible roof system have been disclosed herein, it should be appreciated that various other aspects of the systems can be employed within the present invention. For example, any of the locking configurations disclosed herein can be used for various other joints within the top stack mechanism of the convertible roof, whether soft-top or hard-top in nature. Furthermore, the locking systems described herein can be employed for straight folding convertible roofs as well as outfolding ones, although all of the advantages of the present invention may not be fully realized. It should also be appreciated that biasing devices and/or actuators can be moved to reverse the actively driven direction of lock movement. The description of the invention is merely exemplary in nature and, thus, variations that do not depart from the gist of the invention are intended to be within the scope of the invention.

The invention claimed is:

1. An automotive convertible roof system comprising:
a soft-top roof further comprising a set of roof bows;
a side rail movably coupled to at least one of the roof bows;
the side rail and roof bows being movable from a raised position to a stowed position;
a lock movable from a locking orientation to an unlocking orientation in a substantially vertical direction if viewed in the raised position, the lock securing together the side rail relative to at least one of the roof bows when in the locking orientation; and
operably moving a second lock coupled to the first lock, the second lock being spaced away from the first lock.

2. The system of claim 1 further comprising at least one elongated mechanical member and at least two pivots coupling the first lock to the second lock.

3. The system of claim 1 further comprising a receptacle mounted to a second side rail and the second lock mounted on the first side rail, the second lock operably engaging the receptacle when locked.

4. The system of claim 1 wherein the set of roof bows includes a number one roof bow, further comprising a joint between the number one roof bow and the side rail, wherein the lock substantially prevents rotation of the joint when in the raised position and the lock is in the locking orientation.

5. The system of claim 1 wherein a rear segment of the side rail opposite the lock rotates relative to a vehicle centerline in a substantially cross-vehicle direction when retracted from the raised position to the stowed position and when the lock is in its unlocking orientation.

6. The system of claim 1 wherein the lock linearly moves between the locking and unlocking orientations.

7. An automotive convertible roof system comprising:
a soft-top roof further comprising a set of roof bows;
a side rail movably coupled to at least one of the roof bows;
the side rail and roof bows being movable from a raised position to a stowed position;
a lock movable from a locking orientation to an unlocking orientation in a substantially vertical direction if viewed in the raised position, the lock securing together the side rail relative to at least one of the roof bows when in the locking orientation; and
a front header latch coupled to the lock.

8. An automotive convertible roof system comprising:
a soft-top roof further comprising a set of roof bows;
a side rail movably coupled to at least one of the roof bows;
the side rail and roof bows being movable from a raised position to a stowed position;
a lock movable from a locking orientation to an unlocking orientation in a substantially vertical direction if viewed in the raised position, the lock securing together the side rail relative to at least one of the roof bows when in the locking orientation;
a second side rail movably coupled adjacent to the first side rail;
a third side rail movably coupled adjacent to the second side rail;
the set of roof bows including a number one roof bow;
the number one roof bow being movable relative to the first side rail, which is a front side rail, prior to locking; and
the number one roof bow being substantially prevented from moving relative to the front side rail after locking.

9. The system of claim 8 further comprising operably moving a second lock coupled to the first lock, the second lock being spaced away from the first lock.

10. The system of claim 8 wherein the lock operably deters rotation of the front side rail relative to the number one roof bow along a substantially horizontal plane.

11. An automotive convertible roof system comprising:
a convertible roof having a joint between a side rail and an elongated structural member, the joint retracting with the roof;
a portion of the side rail rotating relative to a vehicle centerline in a substantially cross-vehicle direction during roof retracting movement; and
a lock operable to substantially prevent movement of the joint when the lock is in a first condition, the lock being operable to allow movement of the joint when the lock is in a second condition, wherein the lock moves in a substantially vertical direction between the first and second conditions.

12. The system of claim 11 wherein the member is a fabric covered roof bow, and the lock substantially prevents rotation of the joint when the convertible roof is in its raised position.

13. The system of claim 11 wherein the member is a forwardmost roof bow, as viewed when raised, and the lock operably deters rotation of the side rail relative to the roof bow along a substantially horizontal plane.

14. The system of claim 11 wherein a rear segment of the side rail opposite the lock rotates outwardly away from a vehicle centerline when retracted from the raised position to the stowed position and when the lock is in its second condition.

15. The system of claim 11 further comprising a front header latch coupled to the lock.

16. The system of claim 11 further comprising:
a second joint between the side rail and an adjacent side rail;
a second lock substantially preventing rotation of the second joint when the convertible roof is in its raised position; and
at least one elongated member mechanically coupling the first lock to the second lock.

17. An automotive convertible roof system comprising:
a convertible roof having a joint between a side rail and an elongated structural member, the joint retracting with the roof;
a portion of the side rail rotating relative to a vehicle centerline in a substantially cross-vehicle direction during roof retracting movement; and
a lock operable to substantially prevent movement of the joint when the lock is in a first condition, the lock being operable to allow movement of the joint when the lock is in a second condition,
wherein the lock includes a receptacle and a latching member, the latching member linearly sliding to engage the receptacle when moved from an unlocking orientation to a locking orientation, the receptacle being attached to a first segment of the convertible roof on one side of the joint, and the latching member being attached to a second segment of the convertible roof on an opposite side of the joint.

18. The system of claim 17 wherein the member is a fabric covered roof bow, and the lock substantially prevents rotation of the joint when the convertible roof is in its raised position.

19. The system of claim 17 wherein the member is a forwardmost roof bow, as viewed when raised, and the lock operably deters rotation of the side rail relative to the roof bow along a substantially horizontal plane.

20. The system of claim 17 wherein a rear segment of the side rail opposite the lock rotates outwardly away from a vehicle centerline when retracted from the raised position to the stowed position and when the lock is in its second condition.

21. The system of claim 17 further comprising a front header latch coupled to the lock.

22. The system of claim 17 further comprising:
a second joint between the side rail and an adjacent side rail;
a second lock substantially preventing rotation of the second joint when the convertible roof is in its raised position; and
at least one elongated member mechanically coupling the first lock to the second lock.

23. The system of claim 17 wherein the latching member is coupled to at least one of a plurality of latching members, each operable to engage a plurality of receptacles.

24. An automotive vehicle convertible roof system comprising:
a soft top convertible roof having at least first and second joints that retract with the roof;
a first member operably retracting with the roof, the first member being movable to deter movement of the first joint; and
a second member operably retracting with the roof, the second member being movable to deter movement of the second joint;
the second member operably moving to a deterring position in response to movement of the first member.

25. The system of claim 24 further comprising a roof bow and a side rail, wherein the first joint is between the roof bow and the adjacent side rail, and the first member substantially prevents rotation of the first joint when the convertible roof is in its raised position.

26. The system of claim 24 further comprising a raised forwardmost roof bow and a side rail, and the first member operably deters rotation of the side rail relative to the roof bow along a substantially horizontal plane.

27. The system of claim 24 further comprising a pair of retractable, fore-and-aft adjacent side rails, wherein the second joint is between the rails, and the second member substantially prevents rotation of the second joint when the convertible roof is in its raised position.

28. The system of claim 24 wherein at least one of the members linearly moves between locking and unlocking positions.

29. The system of claim 24 wherein at least one of the members rotates relative to an end of a linkage member while moving between locking and unlocking positions.

30. The system of claim 24 wherein the second member linearly moves between locking and unlocking positions.

31. The system of claim 24 wherein the first member moves in a substantially vertical direction, as viewed in a top-raised position, when moved between locking and unlocking positions.

32. An automotive vehicle convertible roof comprising:
a first elongated, structural side rail;
a second elongated, structural side rail movably coupled to the first side rail, the side rails being movable from a raised position to a retracted position;
a bar movably attached to one of the side rails;
a receptacle attached to the other of the side rails, the bar and the receptacle moving with their respective side rails when the side rails are moved between the raised and retracted positions;
a roof bow coupled to one of the side rails; and
a pliable roof cover attached to the roof bow,
wherein the bar linearly moves to assist in securing the first side rail to the second side rail when the side rails are in at least one of the raised and retracted positions.

33. The convertible roof of claim 32 wherein the bar moves in a substantially fore-and-aft direction.

34. The convertible roof of claim 32 further comprising an electromagnetic device completely moving with at least one of the side rails, the electromagnetic device operably driving the bar.

35. An automotive vehicle convertible roof comprising:
a first joint;
a second joint displaced from the first joint in a fore-and-aft orientation when fully raised;

a lock assembly including a first lock operable to secure the first joint and a second lock operable to secure the second joint, the lock assembly being retractable with the roof;

a top stack mechanism including the joints; and a pliable roof cover attached to the top stack mechanism, wherein the top stack mechanism retracts in an outfolding manner.

36. The convertible roof of claim 35 further comprising a front header latch directly coupled to and moving with the lock assembly.

37. The convertible roof of claim 36 further comprising at least one elongated connector coupling the front header latch to at least one of the locks, at least a second elongated connector coupled the locks to each other.

38. The convertible roof of claim 35 wherein the first lock operably moves in a first direction and the second lock operably moves in a second direction offset from the first direction.

39. The convertible roof of claim 35 further comprising:

a roof bow;

a first side rail; and a second side rail;

the first joint being defined as the interface between the roof bow and the first side rail; and the second joint being defined as the interface between the first and second side rails.

40. An automotive vehicle convertible roof comprising:

a first side rail;

a second side rail pivotably coupled to the first side rail;

a pin projecting from the first side rail; and a receptacle attached to the second side rail;

a hinge pivotally coupling the side rails together adjacent the pin and the receptacle;

the pin being stationarily mounted to the first side rail;

the pin being operable to engage the receptacle when the side rails are aligned in order to deter undesired movement between the first and second side rails; and the pin being operable to disengage the receptacle when the first and second side rails are offset from each other.

41. The convertible roof of claim 40 further comprising an actuator completely attached to one of the side rails operably moving the pin.

42. The convertible roof of claim 41 wherein the actuator is an electromagnetic device.

43. The convertible roof of claim 40 further comprising:

a pliable cover attached to the side rails.

44. A method of operating a soft-top convertible roof for an automotive vehicle, the convertible roof including a roof bow, a side rail and a pliable cover, the method comprising:

(a) moving the soft-top convertible roof between raised and retracted positions;

(b) moving a member in a substantially vertical and linear direction between locking and unlocking conditions;

(c) locking the roof bow to the side rail to prevent movement therebetween; and (d) unlocking the roof bow from the side rail to allow movement therebetween.

45. The method of claim 44 further comprising rotating the side rail about a single pivot axis relative to the roof bow, the pivot axis being substantially vertical when the convertible roof is fully raised.

46. A method of operating a soft-top convertible roof for an automotive vehicle, the convertible roof including a roof bow, a side rail and a pliable cover, the method comprising:

(a) moving the soft-top convertible roof between raised and retracted positions;

(b) moving a member in a substantially vertical direction between locking and unlocking conditions;

(c) locking the roof bow to the side rail to prevent movement therebetween;

(d) unlocking the roof bow from the side rail to allow movement therebetween; and (e) contacting a first end of a lever against a substantially stationary vehicle body panel to cause movement of a second portion of the member to engage a receptacle within at least one of the roof bow and side rail.

47. A method of operating a soft-top convertible roof for an automotive vehicle, the convertible roof including a roof bow, a side rail and a pliable cover, the method comprising:

(a) moving the soft-top convertible roof between raised and retracted positions;

(b) moving a member in a substantially vertical direction between locking and unlocking conditions;

(c) locking the roof bow to the side rail to prevent movement therebetween;

(d) unlocking the roof bow from the side rail to allow movement therebetween; and (e) rotating at least a portion of the side rail in a cross-vehicle direction relative to a centerline of the automotive vehicle as the convertible roof is moved to its retracted position.

48. The method of claim 47 further comprising linearly moving the member to lock a joint between the roof bow and the side rail.

49. The method of claim 47 further comprising rotating the member about a pivot while moving the member to lock a joint between the roof bow and the side rail.

* * * * *